(12) United States Patent
Tamachi et al.

(10) Patent No.: US 10,916,798 B2
(45) Date of Patent: Feb. 9, 2021

(54) ELECTROCHEMICAL CELL AND MANUFACTURING METHOD OF ELECTROCHEMICAL CELL

(71) Applicant: Seiko Instruments Inc., Chiba (JP)

(72) Inventors: Tsuneaki Tamachi, Chiba (JP); Shunji Watanabe, Chiba (JP)

(73) Assignee: SEIKO INSTRUMENTS INC., Chiba (JP)

(*) Notice: Subject to any disclaimer, the term of this patent is extended or adjusted under 35 U.S.C. 154(b) by 533 days.

(21) Appl. No.: 15/399,465

(22) Filed: Jan. 5, 2017

(65) Prior Publication Data

US 2017/0200970 A1 Jul. 13, 2017

(30) Foreign Application Priority Data

Jan. 12, 2016 (JP) .................. 2016-003770
Nov. 14, 2016 (JP) .................. 2016-221899

(51) Int. Cl.

| H01M 10/0525 | (2010.01) |
|---|---|
| H01M 10/0587 | (2010.01) |
| H01M 2/02 | (2006.01) |
| H01M 2/06 | (2006.01) |
| H01M 10/058 | (2010.01) |
| H01M 2/26 | (2006.01) |

(52) U.S. Cl.
CPC ..... *H01M 10/0525* (2013.01); *H01M 2/0285* (2013.01); *H01M 2/06* (2013.01); *H01M 2/26* (2013.01); *H01M 10/058* (2013.01); *H01M 10/0587* (2013.01); *H01M 2/0222* (2013.01)

(58) Field of Classification Search
CPC .................................................. H01M 2/022
See application file for complete search history.

(56) References Cited

U.S. PATENT DOCUMENTS

| 2005/0100784 A1* | 5/2005 | Yageta ............... | H01M 2/06 429/160 |
| 2008/0014500 A1* | 1/2008 | Han ..................... | H01M 4/661 429/178 |
| 2013/0337304 A1* | 12/2013 | Luski ................... | H01M 2/021 429/94 |
| 2016/0380241 A1* | 12/2016 | Yun ..................... | H01M 2/0275 429/144 |

FOREIGN PATENT DOCUMENTS

| JP | 2002-298803 A | 10/2002 |
| JP | 2002367574 A | * 12/2002 |
| JP | 2003223874 A | * 8/2003 |

OTHER PUBLICATIONS

Machine translation of JP 2003-223874 A (Year: 2003).*
Machine Translation of JP 2002-367574 A (Year: 2002).*

* cited by examiner

*Primary Examiner* — Robert S Carrico
(74) *Attorney, Agent, or Firm* — Brinks Gilson & Lione

(57) ABSTRACT

A battery includes: an electrode body; and an external body which is formed by overlapping a first sheet and a second sheet, and in which the electrode body is accommodated. The external body includes an accommodation portion which is formed in the first sheet, and which accommodates the electrode body therein, and a circumferential edge portion in which the first sheet and the second sheet overlap each other around the accommodation portion. The inside of the accommodation portion is sealed in a state where the first sheet and the second sheet are welded to each other in the circumferential edge portion.

6 Claims, 28 Drawing Sheets

ELECTROCHEMICAL CELL AND MANUFACTURING METHOD OF ELECTROCHEMICAL CELL

RELATED APPLICATIONS

This application claims priority under 35 U.S.C. § 119 to Japanese Patent Applications No. 2016-003770 filed on Jan. 12, 2016 and No. 2016-221899 filed on Nov. 14, 2016, the entire content of which is hereby incorporated by reference.

BACKGROUND OF THE INVENTION

Field of the Invention

The present invention relates to an electrochemical cell and a manufacturing method of the electrochemical cell.

Background Art

As an electrochemical cell, such as a nonaqueous electrolyte secondary battery or an electric double layer capacitor, there is a battery which is formed in a shape of a button (hereinafter, including a shape of a coin). The button-like electrochemical cell is used in a power source of various devices or the like. As one aspect of the button-like electrochemical cell, for example, a battery described in JP-A-2002-298803 is suggested.

In JP-A-2002-298803, disclosed is a flat nonaqueous electrolyte secondary battery including a sealing structure which is caulked by caulking processing in which a metal negative electrode case which serves as a negative electrode terminal and a metal positive electrode case which serves as a positive electrode terminal are fitted to each other via an insulation gasket, and further, the positive electrode case compresses the insulation gasket in the radial direction and in the height direction, in which an electrode group in which a positive electrode of a lithium-contained oxide and a negative electrode of a carbonaceous material are wound in a shape of a belt or laminated in a multilayer via a separator, is accommodated together with a nonaqueous electrolyte.

SUMMARY OF THE INVENTION

However, when the caulking processing is performed with respect to the negative electrode case and the positive electrode case, the negative electrode case and the positive electrode case are damaged, and there is a case where sealability of the inside of the battery deteriorates. In addition, a foreign material is nipped when the caulking processing is performed, a void is formed between the negative electrode case and the positive electrode case by the foreign material, and there is a case where the sealability of the inside of the battery deteriorates. Furthermore, by employing a configuration of performing the sealing by the caulking, mechanical sealability is improved, and thus, it becomes necessary to impart strength to stand the caulking to the negative electrode case and the positive electrode case. Therefore, the thickness of the negative electrode case and the positive electrode case increases, a sensitive volume which accommodates a power generating element decreases, and energy density decreases. Accordingly, in the button-like electrochemical cell of the related art, there is room for improvement from the viewpoint of improving the sealability, improving reliability, and improving the energy density.

Here, the invention provides a button-like electrochemical cell having high reliability and high energy density. In addition, the invention provides a manufacturing method of the electrochemical cell which can manufacture an electrochemical cell having high energy density with high quality and at low costs.

According to an aspect of the invention, there is provided an electrochemical cell including: an electrode body which includes a positive electrode body and a negative electrode body; and an external body which is formed by overlapping a first member and a second member, and in which the electrode body is accommodated, in which the external body includes an accommodation portion which is formed at least in one of the first member and the second member, and accommodates the electrode body therein, and a circumferential edge portion in which the first member and the second member overlap each other around the accommodation portion, and in which the inside of the accommodation portion is sealed in a state where the first member and the second member are welded to each other in the circumferential edge portion.

According to the invention, since the inside of the accommodation portion is sealed by the welding between the first member and the second member, even when damage or a foreign material exists between the first member and the second member in the circumferential edge portion, it is possible to wrap the first member or the second member around the damage or the foreign material by welding the first member or the second member. Accordingly, it is possible to prevent the void from being generated between the first member and the second member in the circumferential edge portion, and to improve the sealability of the inside of the accommodation portion. According to this, it is possible to improve reliability of the electrochemical cell.

In addition, in a case where the accommodation portion is sealed by caulking between the first member and the second member, since the first member and the second member have strength to stand the caulking, it is necessary to ensure the thickness of the first member and the second member to be equal to or greater than a predetermined value. According to the invention, since the inside of the accommodation portion is sealed by the welding between the first member and the second member, compared to a configuration in which the accommodation portion is sealed by the caulking between the first member and the second member, it is possible to make the first member and the second member thin. Accordingly, it is possible to ensure the volume of the inside of the accommodation portion to be large, and to improve the energy density of the electrochemical cell.

According to this, a button-like electrochemical cell having high reliability and high energy density is obtained.

In this aspect, the first member and the second member may be formed of a laminate film including a metal material and a resin material.

According to the invention, since the laminate film is soft compared to a metal foil, compared to a configuration in which the first member and the second member are formed of the metal foil, it is possible to improve workability when manufacturing the external body. Therefore, it is possible to reduce the manufacturing costs of the external body, and to achieve an electrochemical cell at low costs.

In this aspect, at least one of the first member and the second member may be formed of a metal material.

According to the invention, compared to a configuration in which the first member and the second member are formed of a resin material, it is possible to improve strength of the external body. Accordingly, it is possible to prevent an external force from acting on the electrode body accommodated in the external body, and to prevent the electrode body from being damaged. Therefore, it is possible to improve the reliability of the electrochemical cell.

In this aspect, the metal material may be stainless steel.

According to the invention, compared to a case where copper or nickel is used as a metal material, it is possible to form at least one of the first member and the second member at low costs. Therefore, it is possible to reduce the manufacturing costs of the external body, and to achieve an electrochemical cell at low costs.

In this aspect, one pair of electrode terminals which are respectively connected to the positive electrode body and the negative electrode body, and are led out to the outside of the external body; and a sealant film which is formed by overlapping one pair of films including a resin material, and nips the electrode terminal, may further be provided, the electrode terminal may be nipped by the first member and the second member via the sealant film in the circumferential edge portion, and the sealant film may be disposed across the entire circumference to surround the accommodation portion, and may be fixed in a state where the first member and the second member are welded to each other, in the circumferential edge portion.

According to the invention, since the electrode terminal is nipped by the first member and the second member via the sealant film in the circumferential edge portion, it is possible to reliably adhere the electrode terminal, the first member, and the second member to one another.

Here, in the circumferential edge portion, when the sealant film is intermittently disposed to surround the accommodation portion, a boundary between a region in which the sealant film is disposed between the first member and the second member and a region in which the first member and the second member directly overlap each other, is formed in an end portion of the sealant film. In the boundary, the welding between the first member, the second member, and the sealant film becomes incomplete, a leak path which communicates with the inside of the accommodation portion and the outside of the external body is formed, and there is a case where the sealability of the inside of the accommodation portion deteriorates. According to the invention, since the sealant film is disposed across the entire circumference to surround the accommodation portion in the circumferential edge portion, and the first member and the second member are welded to each other, it is possible to prevent the leak path which communicates with the inside of the accommodation portion and the outside of the external body from being formed.

Accordingly, it is possible to further improve the sealability of the inside of the accommodation portion, and to further improve the reliability of the electrochemical cell.

In this aspect, the circumferential edge portion may be formed in a shape of a rectangular frame, and the electrode terminal may be led out to the outside of the external body from an angle portion of the circumferential edge portion.

According to the invention, the electrode terminal can be disposed to be along a diagonal line in an external shape of the circumferential edge portion. Therefore, compared to a configuration in which the electrode terminal is led out from a part other than the angle portion of the circumferential edge portion having a shape of a rectangular frame, at a part at which the electrode terminal and the sealant film are in contact with each other, it is possible to provide a long distance from the inside of the accommodation portion to the outside of the external body. Accordingly, it is possible to reduce an amount of moisture which infiltrates into the accommodation portion from the outside of the external body via the part at which the electrode terminal and the sealant film are in contact with each other, and to prevent the electrochemical cell from deteriorating. Therefore, it is possible to further improve the reliability of the electrochemical cell.

In this aspect, the electrode body may be wound in a state where the positive electrode body and the negative electrode body are laminated via a separator, the electrode body may be provided with one pair of tabs connected to the electrode terminal, and the one pair of tabs may extend from an outer circumferential portion of the positive electrode body and the negative electrode body.

According to the invention, since the one pair of tabs extend from the outer circumferential portion of the positive electrode body and the negative electrode body, it becomes possible to dispose each tab to be separated from each other. Therefore, when each tab and the electrode terminal are connected to each other by welding or the like, it is possible to easily prevent a short circuit between each tab. Accordingly, it is possible to prevent work efficiency from deteriorating when manufacturing the electrochemical cell. Therefore, it is possible to achieve an electrochemical cell at low costs.

In this aspect, any one of the positive electrode body and the negative electrode body on the inside of the external body may be connected to the one member.

According to the invention, one member formed of a metal material of the first member and the second member can be functioned as a positive electrode terminal and a negative electrode terminal. Accordingly, it is possible to reduce the number of electrode terminals which are led out to the outside from the inside of the external body. Therefore, it is possible to reduce the manufacturing costs of the electrochemical cell.

In this aspect, any one of the first member and the second member may be formed in a shape of a flat plate, and the accommodation portion may be formed in another member of the first member and the second member.

According to the invention, since one member of the first member and the second member is formed in a shape of a flat plate, it is possible to reduce the manufacturing costs of the external body. Therefore, it is possible to achieve an electrochemical cell at low costs.

In addition, in a case where the accommodation portion is formed in both of the first member and the second member, in a particularly small electrochemical cell, it is necessary to increase positional accuracy when the first member and the second member overlap each other, and an increase in manufacturing costs is caused. Meanwhile, by providing the accommodation portion in another member of the first member and the second member, it is possible to alleviate positional accuracy when the first member and the second member overlap each other. In other words, it is possible to provide an electrochemical cell having a small size and excellent sealability at low costs.

In this aspect, the circumferential edge portion may be folded back toward a side opposite to the accommodation portion in the direction in which the first member and the second member overlap each other.

According to the invention, it is possible to reduce the size of the external shape of the circumferential edge portion when viewed from the direction in which the first member and the second member overlap each other. Therefore, an electrochemical cell having high energy density is obtained.

Furthermore, in a case where a part of the circumferential edge portion is used as a collecting terminal, it becomes possible to improve mechanical strength as the circumferential edge portion is folded back. Therefore, it is possible to reduce possibility of generation of contact failure between an external wiring and the collecting terminal, and to further improve the reliability of the electrochemical cell.

In this aspect, the circumferential edge portion may be bent toward the accommodation portion side in the direction in which the first member and the second member overlap each other.

According to the invention, it is possible to reduce the size of the external shape of the circumferential edge portion when viewed from the direction in which the first member and the second member overlap each other. Therefore, an electrochemical cell having high energy density is obtained.

Furthermore, in a case where a part of the circumferential edge portion is used as the collecting terminal, it becomes possible to improve the mechanical strength as the circumferential edge portion is bent. Therefore, it is possible to reduce a possibility of generation of the contact failure between the external wiring and the collecting terminal, and to further improve the reliability of the electrochemical cell.

In this aspect, the circumferential edge portion may be disposed to be along an outer circumferential surface of the accommodation portion.

According to the invention, compared to a configuration in which the circumferential edge portion protrudes along the direction of being separated from the accommodation portion, it is possible to reduce the size of the external shape of the external body. Therefore, an electrochemical cell having high energy density is obtained.

In this aspect, a void may be provided between the circumferential edge portion and the outer circumferential surface of the accommodation portion.

According to the invention, in a case where a member, such as a heater, which is heated in the circumferential edge portion is pressed, and the first member and the second member are welded to each other, it is possible to dispose the member, such as the heater, in the void between the circumferential edge portion and the accommodation portion, and to nip the circumferential edge portion from both surfaces of the circumferential edge portion. Therefore, the first member and the second member can be welded to each other by practically heating the circumferential edge portion. Accordingly, it is possible to prevent the leak path which communicates with the inside of the accommodation portion and the outside of the external body from being formed. Therefore, it is possible to further improve the sealability of the inside of the accommodation portion, and to further improve the reliability of the electrochemical cell.

In this aspect, the accommodation portion may be formed in both of the first member and the second member.

According to the invention, compared to a configuration in which the accommodation portion is formed in any one of the first member and the second member, it is possible to reduce the depth of the accommodation portions which are formed in each of the first member and the second member. Accordingly, it is possible to prevent the strength of the first member and the second member from deteriorating in the accommodation portion formed by a drawing processing. Therefore, it is possible to achieve an electrochemical cell having high quality.

In this aspect, the first member and the second member may be formed to be integrated with each other.

According to the invention, it is possible to reduce the number of components, and to achieve an electrochemical cell at low costs.

According to another aspect of the invention, there is provided a manufacturing method of an electrochemical cell including an electrode body which includes a positive electrode and a negative electrode; and an external body which is formed by overlapping a first member and a second member, and in which the electrode body is accommodated, in which the external body includes an accommodation portion which is formed at least in one of the first member and the second member, and accommodates the electrode body therein, and a circumferential edge portion in which the first member and the second member overlap each other around the accommodation portion, the method including: a bending process of bending a part which corresponds to the circumferential edge portion of the first member and the second member to be along an outer circumferential surface of the accommodation portion; and a welding process of welding the circumferential edge portion, in which the welding process is performed after the bending process.

In a case of manufacturing an electrochemical cell in which the circumferential edge portion is disposed to be along the outer circumferential surface of the accommodation portion, it is necessary to bend the circumferential edge portion to be along the outer circumferential surface of the accommodation portion. The circumferential edge portion in which the first member and the second member are welded and integrated with each other becomes thicker than each of the first member and the second member. Therefore, the circumferential edge portion in which the first member and the second member are welded and integrated with each other becomes more unlikely to be bent than a case where parts which correspond to the circumferential edge portions of each of the first member and the second member are separately bent. Furthermore, when the circumferential edge portion in which the first member and the second member are welded and integrated with each other is bent, a larger load is applied to the circumferential edge portion than that of a case where the parts which correspond to the circumferential edge portions of each of the first member and the second member are respectively bent.

According to the invention, since the welding process is performed after the bending process, it is possible to easily bend the part which corresponds to the circumferential edge portion. Therefore, it becomes possible to easily form the external body, and to reduce the manufacturing costs. Furthermore, since the welding process is performed after the bending process, it is possible to reduce the load applied to the circumferential edge portion to be smaller compared to that of a case where the bending process is performed after the welding process, and thus, it is possible to prevent the circumferential edge portion from being damaged, and to prevent quality from deteriorating. However, since the circumferential edge portion is disposed to be along the outer circumferential surface of the accommodation portion, it is possible to reduce the size of the external shape of the external body, and an electrochemical cell having high energy density is obtained. Therefore, it is possible to manufacture an electrochemical cell having high energy density with high quality and at low costs.

According to the electrochemical cell of the invention, a button-like electrochemical cell having high reliability and high energy density is obtained.

According to the manufacturing method of the electrochemical cell of the invention, it is possible to manufacture an electrochemical cell having high energy density with high quality and at low costs.

DETAILED DESCRIPTION OF THE INVENTION

Hereinafter, embodiments of the invention will be described based on the drawings. In addition, in the following description, a button-like electrochemical cell is described using a lithium-ion rechargeable battery (hereinafter, simply referred to as "battery") which is one type of a nonaqueous electrolyte secondary battery as an example.

First Embodiment

First, a battery 1 of a first embodiment will be described.

Battery

Figure 1:
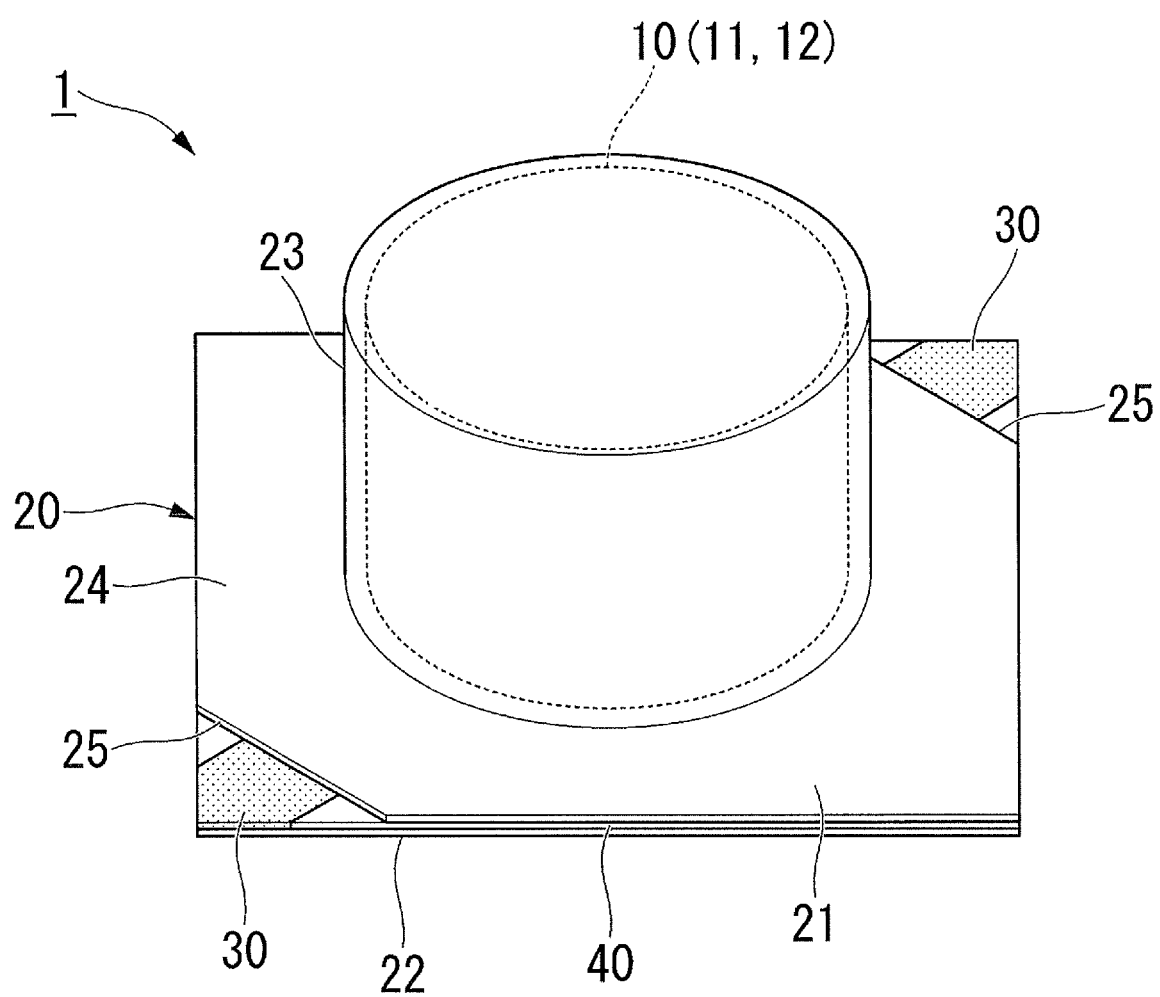
FIG. 1 is a perspective view of a battery according to a first embodiment.

FIG. 1 is a perspective view of a battery according to the first embodiment.

As illustrated in FIG. 1, the battery 1 includes: an electrode body 10 including a positive electrode body 11 and a negative electrode body 12; an external body 20 in which the electrode body 10 is accommodated; one pair of electrode terminals 30 which are respectively connected to the positive electrode body 11 and the negative electrode body 12; and a sealant film 40 which nips the electrode terminal 30.

Figure 2:
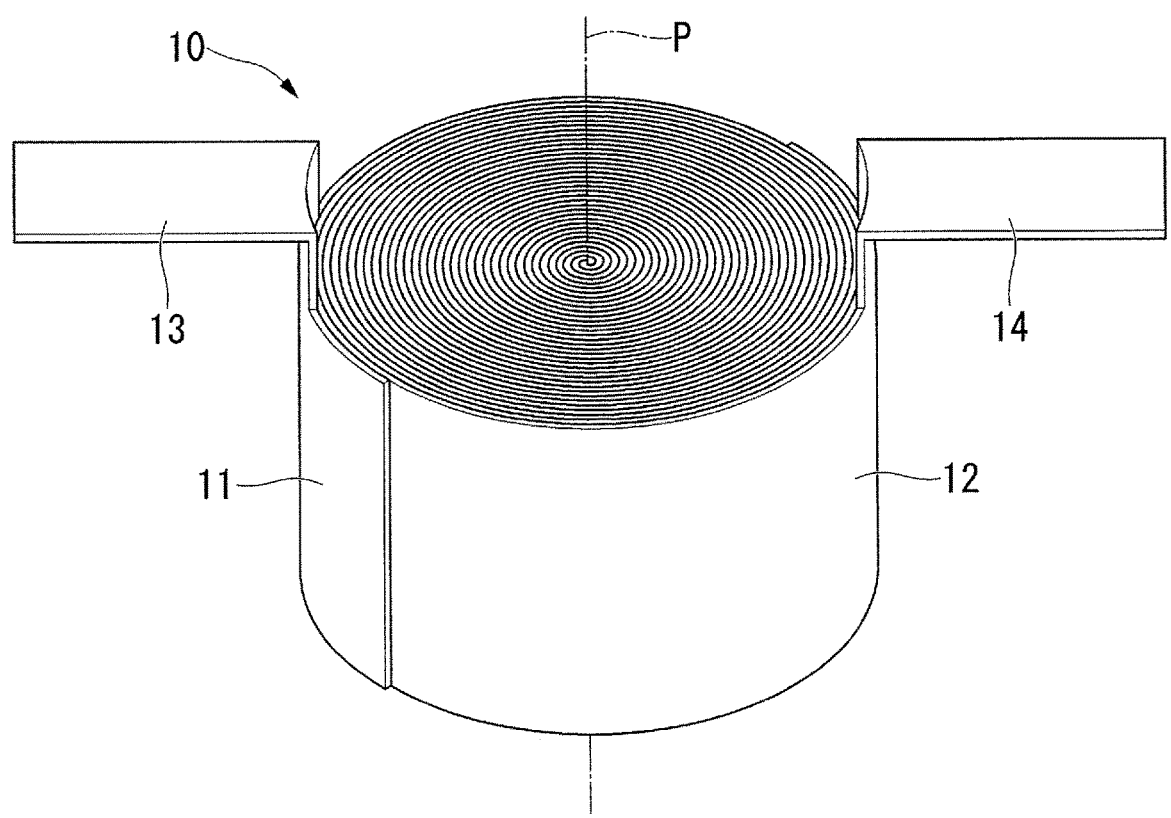
FIG. 2 is a perspective view of an electrode body according to the first embodiment.

FIG. 2 is a perspective view of an electrode body according to the first embodiment.

As illustrated in FIG. 2, the electrode body 10 is formed in a columnar shape around which the positive electrode body 11 and the negative electrode body 12 which have a shape of a belt are wound overlapping each other. More specifically, the electrode body 10 has a structure in which the positive electrode body 11 and the negative electrode body 12 which have a shape of a long belt are wound around a winding shaft P in a state of being laminated via a separator which is not illustrated. In addition, the electrode body 10 may be provided with a core which is used when winding the positive electrode body 11 and the negative electrode body 12 on the winding shaft P.

Here, as the core, a core which is formed of a metal material or a resin material may be used. In addition, in a case where the core remains in the external body 20 even after sealing the battery, and in a case where the resin material is used as a material of the core, when the core has a hollow structure, it is possible to further reduce the weight of the battery 1. In addition, in a case where the metal material is used as a material of the core, it is also possible to use the core as a winding shaft having a function of a lead line which takes out electricity from a collecting body of the electrode body 10 to the outside of the electrode body 10. At this time, by using two winding shafts which are respectively insulated, it is also possible to use the core as a lead of each of the positive and negative electrodes.

The electrode body 10 includes a positive electrode tab 13 (tab) and a negative electrode tab 14 (tab) which are connected to the electrode terminal 30. Each of the tabs 13 and 14 respectively extends from the outer circumferential portion of the positive electrode body 11 and the negative electrode body 12. The positive electrode tab 13 is electrically connected to a positive electrode collecting body (collecting foil) of the positive electrode body 11. The negative electrode tab 14 is electrically connected to a negative electrode collecting body (collecting foil) of the negative electrode body 12. Each of the tabs 13 and 14 may be respectively formed to be integrated with the collecting body, or may be formed to be separated from the collecting body, and be respectively attached to the collecting body by the welding or the like. In addition, in a case where the tabs 13 and 14 are attached to the collecting body, there is a possibility that end surfaces of the tabs 13 and 14 or burrs generated when the welding is performed cause damage to the other member, and thus, it is desirable that an insulating tape sticks to the tabs 13 and 14. In addition, on a surface opposing each of the electrode bodies 11 and 12, it is desirable that a part (a part at which the collecting body is exposed) which is not coated with an electrode including an active material is insulated by performing the covering with the tape or the like.

In addition, in the embodiment, the positive electrode tab 13 and the negative electrode tab 14 extend from the outer circumferential portions of the positive electrode body 11 and the negative electrode body 12, but the invention is not limited thereto. The positive electrode tab and the negative electrode tab may extend from the inner circumferential portions of the positive electrode body and the negative electrode body, or one of the positive electrode tab and the negative electrode tab may extend from the outer circumferential portion, and the other one may extend from the inner circumferential portion. However, by extending each tab from the outer circumferential portion, it becomes possible to dispose the positive electrode tab and the negative electrode tab to be separated from each other. Therefore, when each tab and the electrode terminal 30 are connected to each other by the welding or the like, it is possible to easily prevent the short circuit of each tab. Accordingly, from the viewpoint that it is possible to prevent work efficiency from deteriorating, it is preferable that each of the tabs 13 and 14 is configured to extend from the outer circumferential portion as described in the embodiment.

As illustrated in FIG. 1, the external body 20 is formed by overlapping a first sheet 21 (first member) and a second sheet 22 (second member). The external body 20 includes a cylindrical accommodation portion 23, and a circumferential edge portion 24 in which the first sheet 21 and the second sheet 22 overlap each other around the accommodation portion 23.

The first sheet 21 and the second sheet 22 are formed of a laminate film having a metal foil, a resin fusion layer provided on an overlapping surface (inner surface), and a resin protection layer provided on an outer surface. The metal foil is formed by using the metal material which blocks outer air or vapor, such as stainless steel or aluminum, and passivation can be performed in advance between the metal foil and the fusion layer. The fusion layer of the overlapping surface is formed by using a thermoplastic resin, such as polyethylene or polypropylene of polyolefin. The following material can be appropriately selected as polyolefin. Examples of polyolefin can include any material among high pressure low density ethylene (LDPE) or low pressure high density ethylene (HDPE), inflation polypropylene (IPP) film, non-stretched polypropylene (CPP) film, biaxially stretched polypropylene (OPP) film, and linear short-chain branched polyethylene (L-LDPE, metallocene catalyst specification). In particular, a polypropylene resin is preferable. The protection layer of the outer surface is formed by using polyester, such as the above-described polyolefin or polyethylene terephthalate, or nylon. The fusion layer of the overlapping surface and the protection layer of the outer surface are bonded by thermal fusion or an adhesive via a bonding layer between each metal foil.

Figure 3:
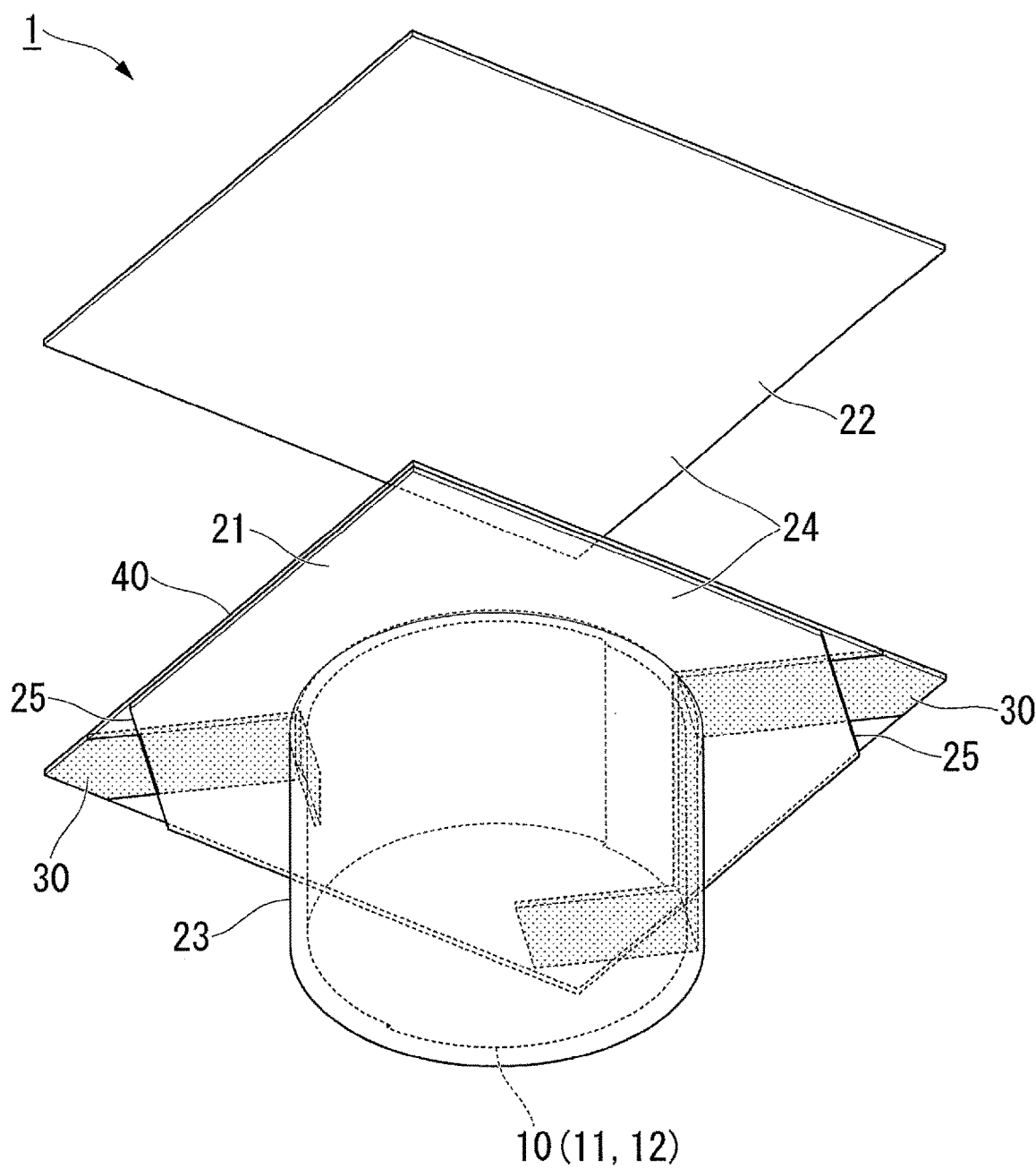
FIG. 3 is an exploded perspective view of the battery according to the first embodiment.
Figure 4:
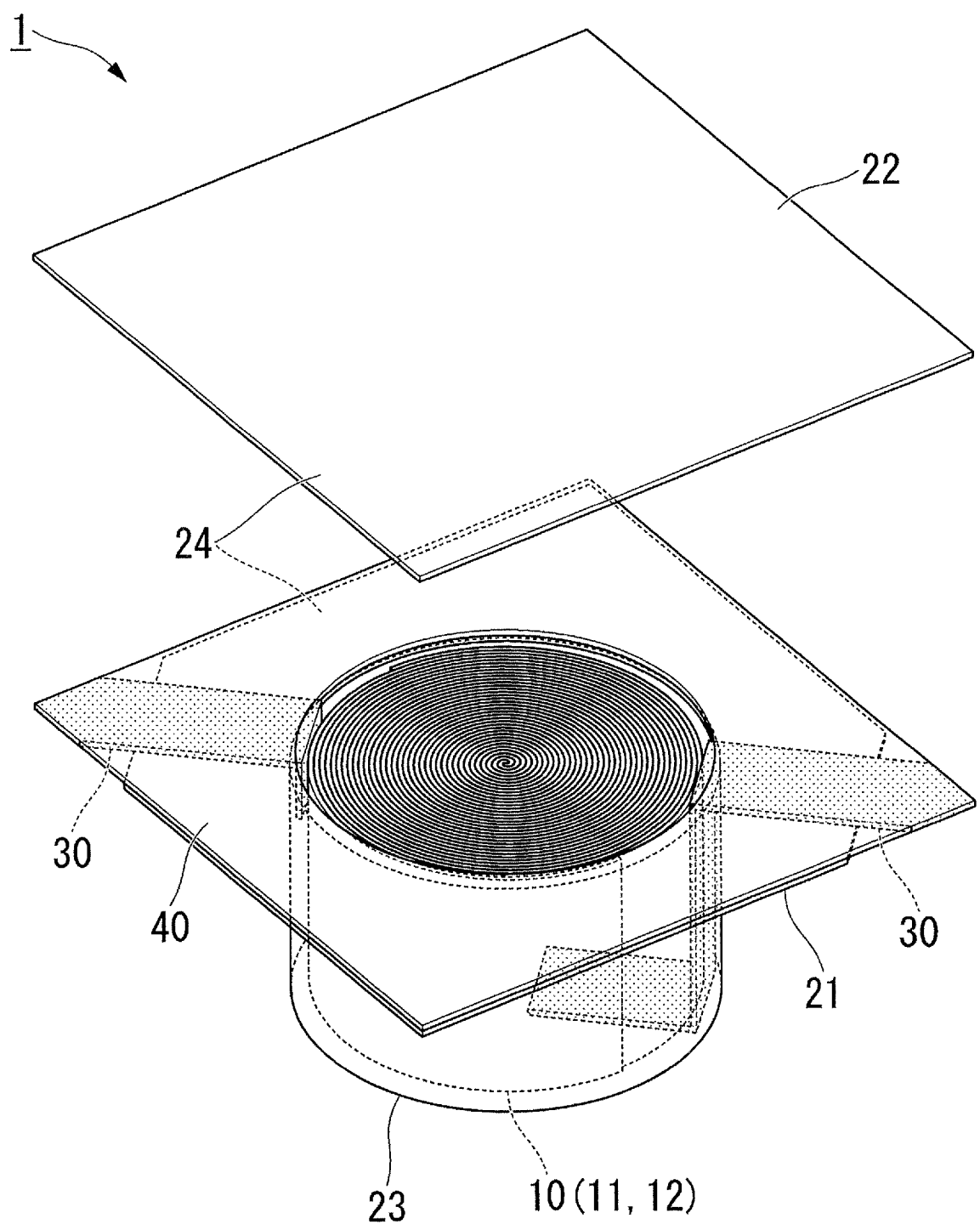
FIG. 4 is an exploded perspective view of the battery according to the first embodiment.

FIGS. 3 and 4 are exploded perspective view of the battery according to the first embodiment.

As illustrated in FIG. 3, in the first sheet 21, the bottomed cylindrical accommodation portion 23 is formed. A dimension of the accommodation portion 23 in the center shaft direction becomes, for example, approximately 5.4 mm. In addition, an outer diameter of the accommodation portion 23 becomes, for example, approximately 7.9 mm or approximately 11.6 mm. The accommodation portion 23 accommodates the electrode body 10 on the inside thereof. On the inside of the accommodation portion 23, the electrode body 10 is disposed so that the winding shaft P (refer to FIG. 2) substantially matches the center shaft of the accommodation portion 23.

The second sheet 22 is formed in a shape of a rectangular flat plate.

As illustrated in FIG. 1, the circumferential edge portion 24 overhangs toward the outside of the accommodation portion 23 in the radial direction from the end portion opposite to a bottom portion of the accommodation portion 23. The circumferential edge portion 24 is formed in a shape of a rectangular frame. In an angle portion of the first sheet 21 in the circumferential edge portion 24, a cutout portion 25 is formed. In the embodiment, one pair of cutout portions 25 are formed in each of one pair of angle portions positioned on one pair of the same angle lines of the first sheet 21 in the circumferential edge portion 24.

The inside of the accommodation portion 23 is sealed in a state where the first sheet 21 and the second sheet 22 nip and weld the sealant film 40 which will be described later in the circumferential edge portion 24. As a welding method between the first sheet 21 and the second sheet 22, ultrasonic welding or thermal welding, such as welding which is used in the heater or the like and laser welding, can be employed being combined with each other as necessary.

As illustrated in FIG. 4, the sealant film 40 is disposed between the first sheet 21 and the second sheet 22 in the circumferential edge portion 24. The sealant film 40 is formed by overlapping one pair of films formed of the thermoplastic resin, such as polyolefin, polyethylene, or polypropylene, and nips the one pair of electrode terminals 30. The sealant film 40 is formed in a shape of a rectangular frame which corresponds to the circumferential edge portion 24. As illustrated in FIG. 1, the sealant film 40 is disposed across the entire circumference to surround the accommodation portion 23 in the circumferential edge portion 24. The sealant film 40 is fixed in a state of being welded to the first sheet 21 and the second sheet 22.

In addition, it is preferable that the overlapping films when forming the sealant film 40 is formed by laminating the materials having different fusion points. Specifically, it is preferable to use a material having a high fusion point on a surface side on which the films overlap each other, and to use a material having a low fusion point on an outer side. Accordingly, it is possible to improve adhesion with the fusion layer of the overlapping surface in each of the first sheets 21 and 22 of the external body 20.

In addition, between the one pair of films which form the sealant film 40, non-woven fabric having a high fusion point may be interposed. Accordingly, the resin material is melted when the thermal welding is performed, and it is possible to prevent the resin from flowing in the longitudinal direction due to pressurization.

It is possible to appropriately select the following material as polyolefin which forms the sealant film 40. Examples of the polyolefin can include any material among high pressure low density ethylene (LDPE) or low pressure high density ethylene (HDPE), inflation polypropylene (IPP) film, non-stretched polypropylene (CPP) film, biaxially stretched polypropylene (OPP) film, and linear short-chain branched polyethylene (L-LDPE, metallocene catalyst specification). In addition, by using a blended polymer into which the above-described olefin is mixed at an appropriate proportion, it is preferable to use a material having a lower fusion point than that of the fusion layer of the overlapping surface in each of the sheets 21 and 22 of the external body 20.

As illustrated in FIG. 3, the electrode terminal 30 is formed in a shape of a belt. As a material which forms the electrode terminal 30, aluminum or aluminum alloy is appropriate in a case where the electrode terminal 30 is used for the positive electrode of the battery or an electric double layer capacitor. In addition, in a case where the electrode terminal 30 is used as a negative electrode of the battery, nickel or nickel alloy, or copper to which nickel plating is performed, is appropriate. The one pair of electrode terminals 30 are connected to the electrode body 10 on the inside of the accommodation portion 23, intersects with the circumferential edge portion 24 of the external body 20, and led out to the outside of the external body 20 from the cutout portion 25 formed in the angle portion of the circumferential edge portion 24. The electrode terminal 30 is supported by the angle portion of the second sheet 22 (refer to FIG. 1). The one pair of electrode terminals 30 are nipped by the one pair of films which form the sealant film 40 at a position of intersecting with the circumferential edge portion 24. Accordingly, the one pair of electrode terminals 30 are nipped by the first sheet 21 and the second sheet 22 via the sealant film 40. The electrode terminal 30 is provided so that a surface on the first sheet 21 side is exposed in the direction in which the first sheet 21 and the second sheet 22 overlap each other, at the angle portion of the sealant film 40.

Figure 5:
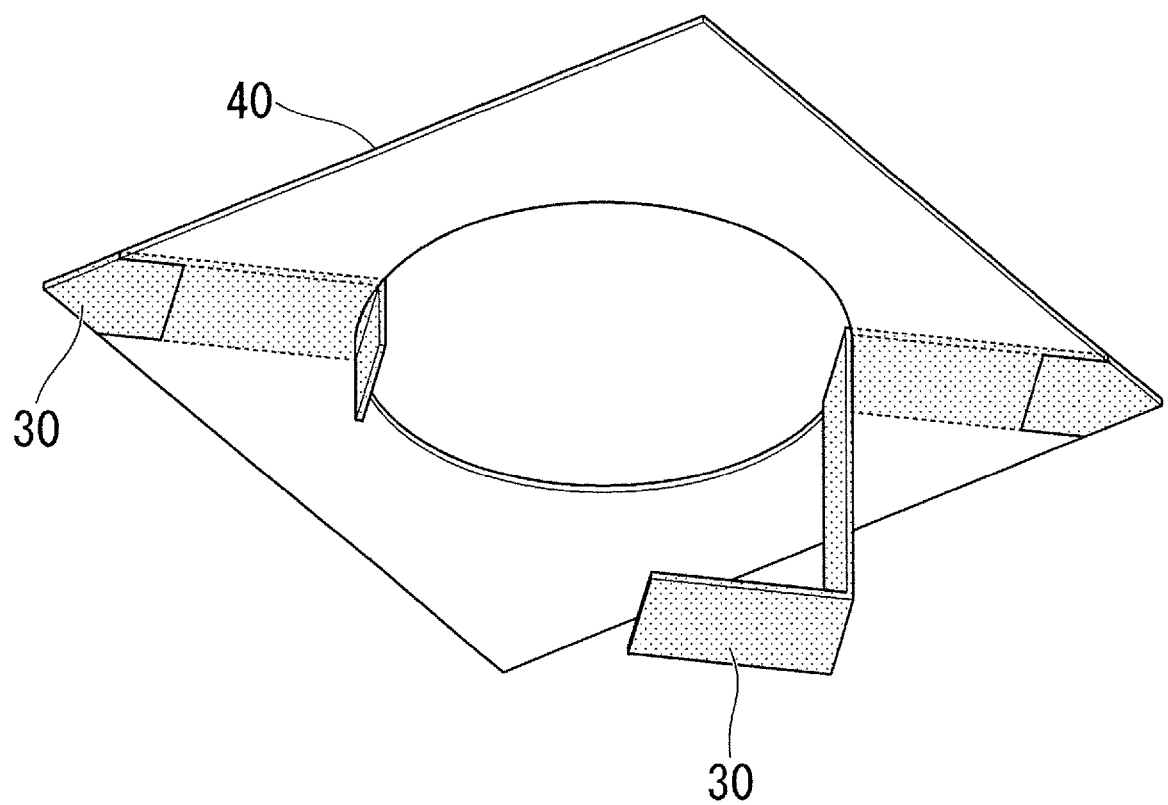
FIG. 5 is a perspective view of a sealant film and an electrode terminal according to the first embodiment.

As illustrated in FIGS. 3 and 5, one electrode terminal 30 of the one pair of electrode terminals 30 extends between the electrode body 10 and the inner circumferential surface of the accommodation portion 23 from the inner circumferential edge of the circumferential edge portion 24 on the inside of the accommodation portion 23. One electrode terminal 30 is connected to any one of the positive electrode tab 13 and the negative electrode tab 14 between the electrode body 10 and the inner circumferential surface of the accommodation portion 23. The other electrode terminal 30 of the one pair of electrode terminals 30 extends between the electrode body 10 and the inner surface of the bottom portion of the accommodation portion 23 through the space between the electrode body 10 and the inner circumferential surface of the accommodation portion 23 from the inner circumferential edge of the circumferential edge portion 24 on the inside of the accommodation portion 23. The other electrode terminal 30 is connected to the other one of the positive electrode tab 13 and the negative electrode tab 14 between the electrode body 10 and the inner surface of the bottom portion of the accommodation portion 23. In addition, the shape of each electrode terminal 30 is not limited to the above-described shape, and may be appropriately changed in accordance with the shape or the position of the positive electrode tab 13 and the negative electrode tab 14.

In this manner, according to the embodiment, since the inside of the accommodation portion 23 is sealed by the thermal welding between the first sheet 21 and the second sheet 22, even when damage or a foreign material exists between the first sheet 21 and the second sheet 22 in the circumferential edge portion 24, it is possible to allow the first sheet 21 or the second sheet 22 to be wrapped around the damage or the foreign material by melting the first sheet 21 or the second sheet 22. Accordingly, it is possible to prevent the void from being generated between the first sheet 21 and the second sheet 22 in the circumferential edge portion 24, and to improve the sealability of the inside of the accommodation portion 23. Accordingly, it is possible to improve the reliability of the battery 1.

In addition, in a case where the accommodation portion is sealed by the caulking, in order to impart the strength to stand the caulking to the external body, it is necessary to ensure the thickness of the external body to be equal to or greater than a predetermined value. According to the invention, since the inside of the accommodation portion 23 is sealed by the welding between the first sheet 21 and the second sheet 22, compared to a configuration in which the accommodation portion is sealed by the caulking between the first sheet and the second sheet, it is possible to make the first sheet 21 and the second sheet 22 thin. Accordingly, it is possible to ensure the volume of the inside of the accommodation portion 23 to be large, and to improve the energy density of the battery 1.

Above, the button-like battery 1 having high reliability and high energy density in which the accommodation portion 23 is formed in a cylindrical shape, is obtained.

In addition, the first sheet 21 and the second sheet 22 are formed of the laminate film including the metal material and the resin material. Since the laminate film is soft compared to the metal foil, compared to a configuration in which the first sheet and the second sheet are formed of the metal foil, it is possible to improve workability when manufacturing the external body 20. Therefore, it is possible to reduce the manufacturing costs of the external body 20, and to achieve the battery 1 at low costs.

In addition, by forming the external body 20 by the laminate film, it becomes possible to reduce the weight of the entire battery 1. In the electrochemical cell loaded on a small wearable device, a proportion of the weight of the electrochemical cell in the weight of the entire device is likely to increase, and thus, the reduction of the weight of the electrochemical cell causes the reduction of the weight of the entire device, and it becomes possible to improve usability of the user.

In addition, in the circumferential edge portion 24, since the electrode terminal 30 is nipped by the first sheet 21 and the second sheet 22 via the sealant film 40, it is possible to reliably adhere the electrode terminal 30, the first sheet 21, and the second sheet 22, to one another.

Here, in the circumferential edge portion 24, when the sealant film is intermittently disposed to surround the accommodation portion 23, in the end portion of the sealant film, a boundary between a region in which the sealant film is disposed between the first sheet 21 and the second sheet 22, and a region in which the first sheet 21 and the second sheet 22 directly overlap each other, is formed. In the boundary, the welding between the first sheet 21, the second sheet 22, and the sealant film becomes incomplete, a leak path which communicates with the inside of the accommodation portion 23 and the outside of the external body 20 is formed, and there is a case where the sealability of the inside of the accommodation portion 23 deteriorates. According to the embodiment, the sealant film 40 is disposed across the entire circumference to surround the accommodation portion 23 in the circumferential edge portion 24, and is welded to the first sheet 21 and the second sheet 22, and thus, it is possible to prevent the leak path which communicates with the inside of the accommodation portion 23 and the outside of the external body 20 from being formed.

According to this, it is possible to further improve the sealability of the inside of the accommodation portion 23, and to further improve the reliability of the battery 1.

In addition, by forming the surfaces welded to each other are formed of the same material in the first sheet 21, the second sheet 22, and the sealant film 40, it is possible to more uniformly weld the first sheet 21, the second sheet 22, and the sealant film 40. Accordingly, it is possible to more reliably prevent the leak path which communicates with the inside of the accommodation portion 23 and the outside of the external body 20 from being formed.

In addition, since the one pair of electrode terminals 30 are led out to the outside of the external body 20 from the angle portion of the circumferential edge portion 24 formed in a shape of a rectangular frame, it is possible to dispose the electrode terminal 30 to be along a diagonal line in the external shape of the circumferential edge portion 24. Therefore, compared to a configuration in which the electrode terminal is led out from the part other than the angle portion of the circumferential edge portion having a shape of a rectangular frame, it is possible to provide a long distance from the inside of the accommodation portion 23 to the outside of the external body 20 at a part at which the electrode terminal 30 and the sealant film 40 are in contact with each other. Accordingly, it is possible to reduce an amount of moisture which infiltrates into the accommodation portion 23 from the outside of the external body 20 via the part at which the electrode terminal 30 and the sealant film 40 are in contact with each other, and to prevent the battery 1 from deteriorating. Therefore, it is possible to further improve the reliability of the battery 1.

In addition, since the positive electrode tab 13 and the negative electrode tab 14 extend from the outer circumferential portions of the positive electrode body 11 and the negative electrode body 12, it is possible to dispose the positive electrode tab 13 and the negative electrode tab 14 to be separated from each other. Therefore, when connecting each of the tabs 13 and 14 and the electrode terminal 30 to each other by the welding or the like, it is possible to easily prevent a short circuit of each of the tabs 13 and 14. Accordingly, it is possible to prevent the work efficiency from deteriorating when manufacturing the battery 1. Therefore, it is possible to achieve the battery 1 at low costs.

In addition, since the second sheet 22 is formed in a shape of a flat plate, it is possible to reduce the manufacturing costs of the external body 20. Therefore, it is possible to achieve the battery 1 at low costs.

In addition, in a case where the accommodation portions are formed in both of the first sheet and the second sheet, in a particularly small battery, it is necessary to improve positional accuracy when overlapping the first sheet and the second sheet, and an increase in manufacturing costs is caused. Meanwhile, by providing the accommodation portion 23 only in the first sheet 21, it is possible to alleviate positional accuracy when the first sheet 21 and the second sheet 22 overlap each other. In other words, it becomes possible to provide the battery 1 having a small size and sealability at low costs.

In addition, in the above-described embodiment, the cutout portion 25 is formed in the angle portion of the first sheet 21 in the circumferential edge portion 24, but may be formed in the angle portion of the second sheet 22 in the circumferential edge portion 24. In this case, in the angle portion of the sealant film 40, the electrode terminal 30 is provided so that the surface on the second sheet 22 side is exposed in the direction in which the first sheet 21 and the second sheet 22 overlap each other.

In addition, not being limited to a configuration where the electrode terminal 30 is led out from the cutout portion 25, the electrode terminal 30 may have a configuration of extending from the angle portion of the circumferential edge portion 24.

Modification Example of First Embodiment

In addition, in the above-described first embodiment, the one pair of electrode terminals 30 are led out to the outside of the external body 20 from the cutout portion 25 provided in the one pair of angle portions positioned on the same diagonal line of the circumferential edge portion 24, but the invention is not limited thereto.

Figure 6:
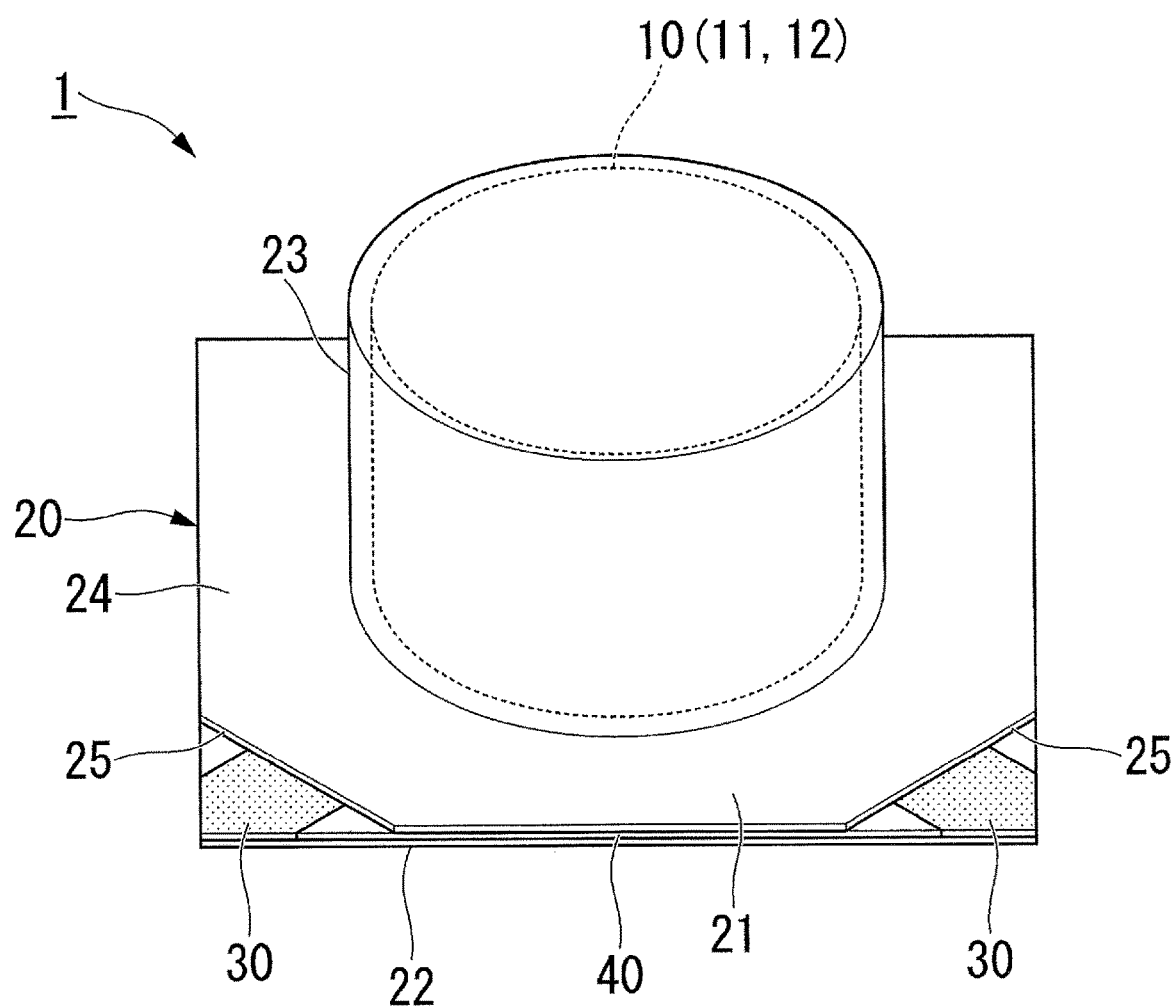
FIG. 6 is a perspective view of a battery according to a first modification example of the first embodiment.

FIG. 6 is a perspective view of the battery according to a first modification example of the first embodiment.

For example, as illustrated in FIG. 6, the cutout portion 25 may be provided in the one pair of adjacent angle portions of the circumferential edge portion 24, and the one pair of electrode terminals 30 may be respectively led out to the outside of the external body 20 from the angle portions provided with the cutout portion 25.

Figure 7:
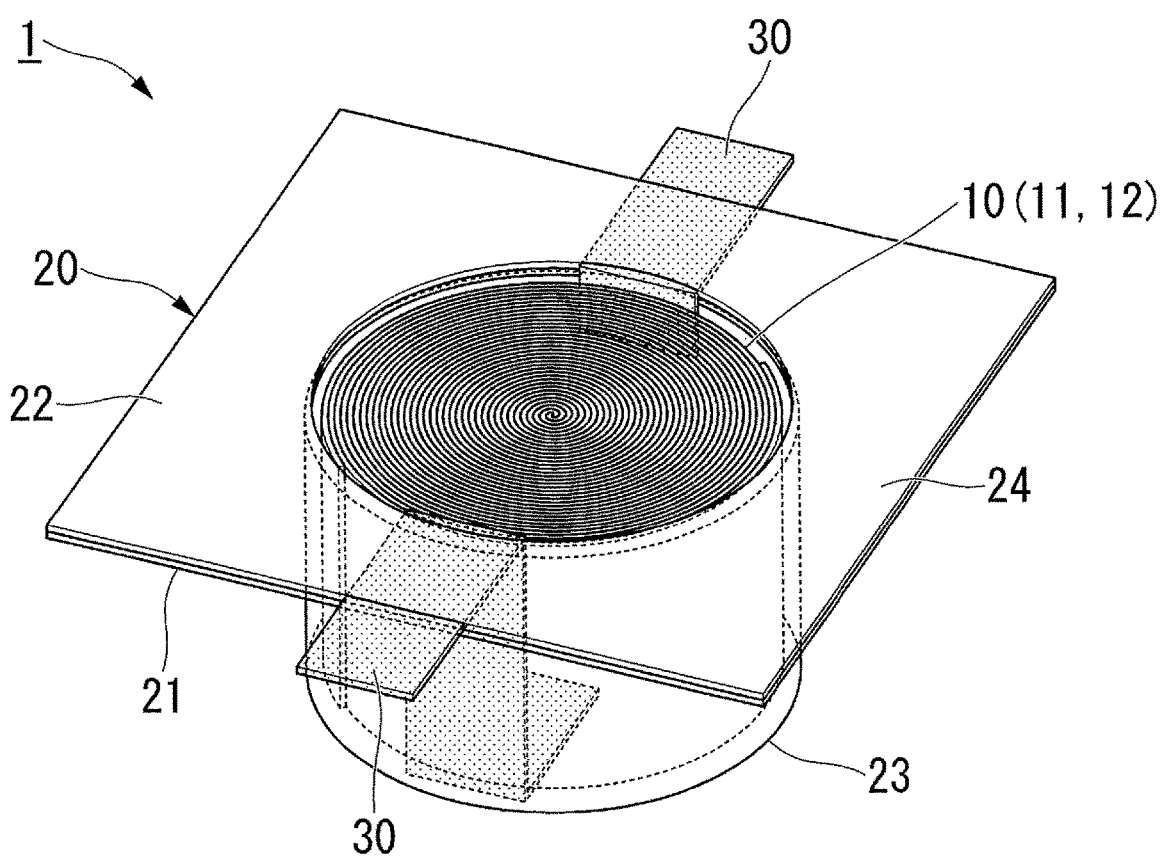
FIG. 7 is a perspective view of a battery according to a second modification example of the first embodiment.

FIG. 7 is a perspective view of the battery according to a second modification example of the first embodiment.

In addition, as illustrated in FIG. 7, the one pair of electrode terminals 30 may be led out to the outside of the external body 20 from an intermediate part on an end side of the circumferential edge portion 24.

Second Embodiment

Next, a battery 101 of a second embodiment will be described.

Figure 8:
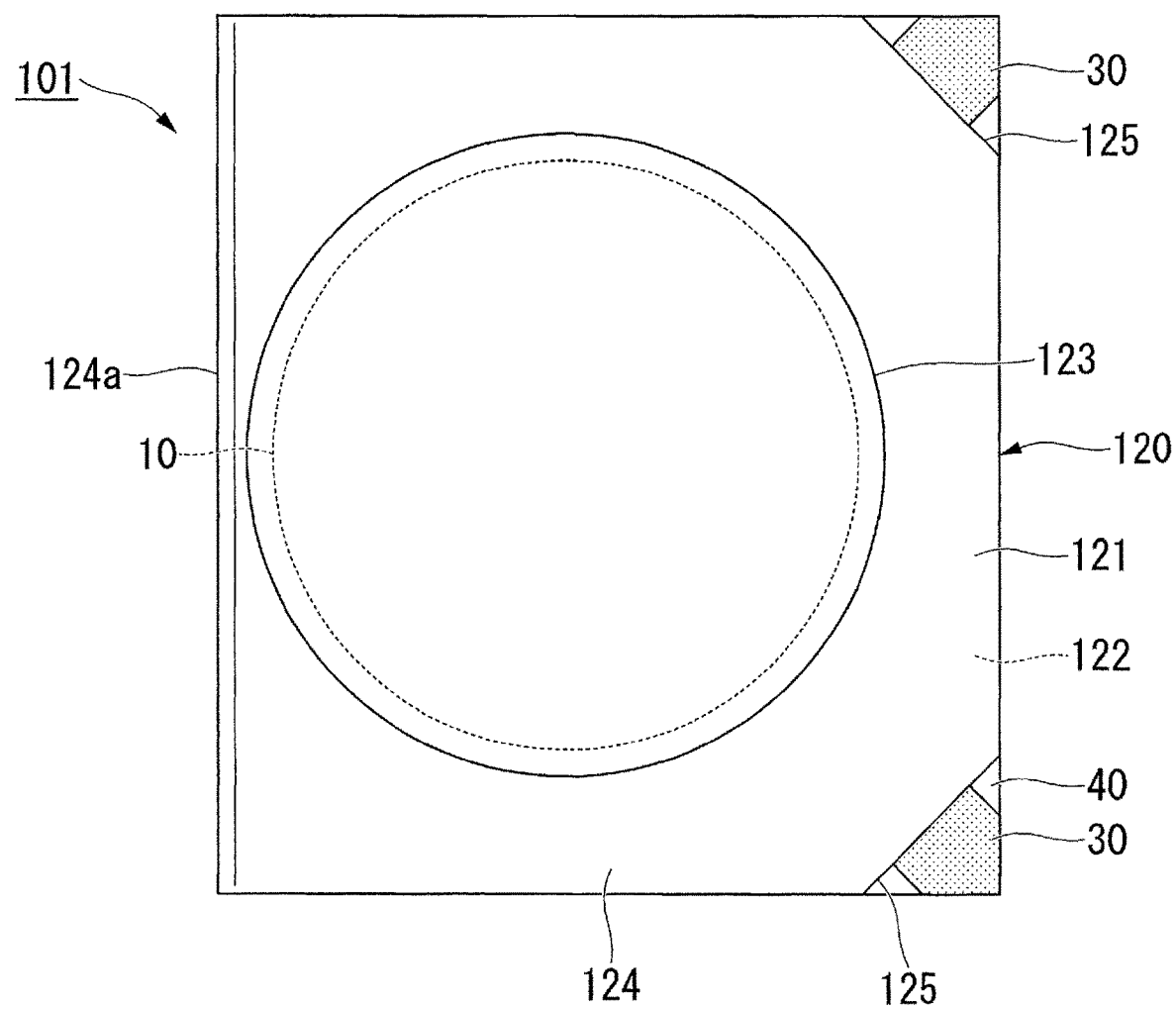
FIG. 8 is a plan view of a battery according to a second embodiment.
Figure 9:
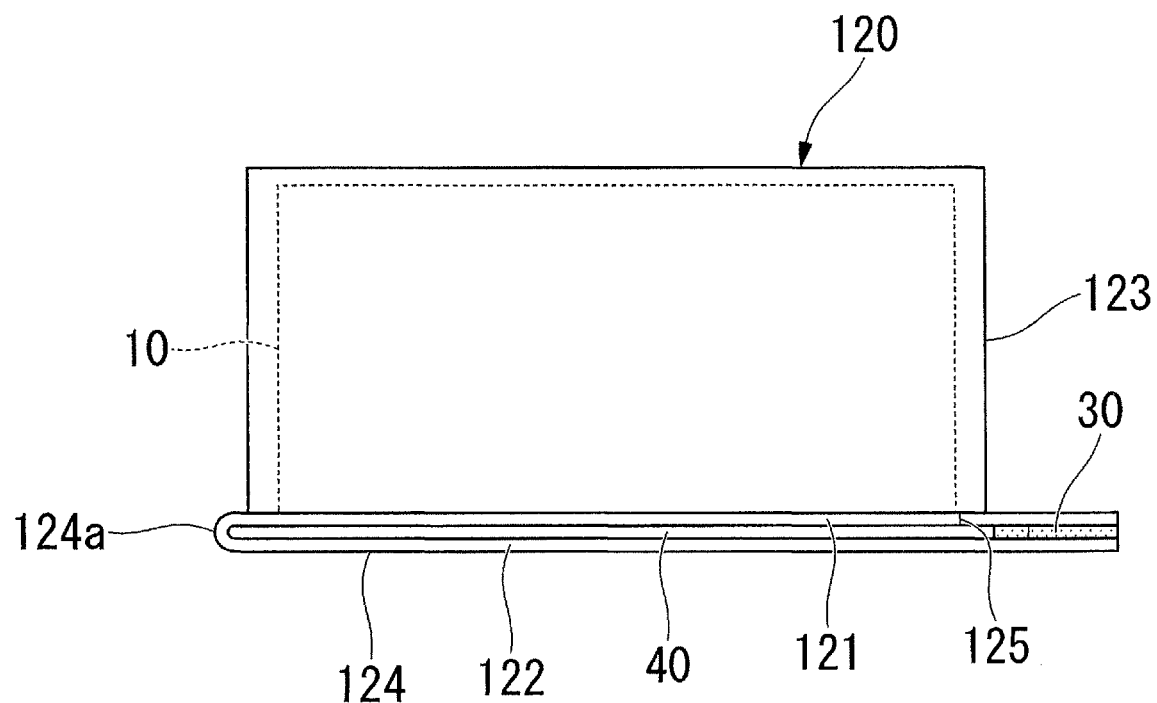
FIG. 9 is a side view of the battery according to the second embodiment.
Figure 10:
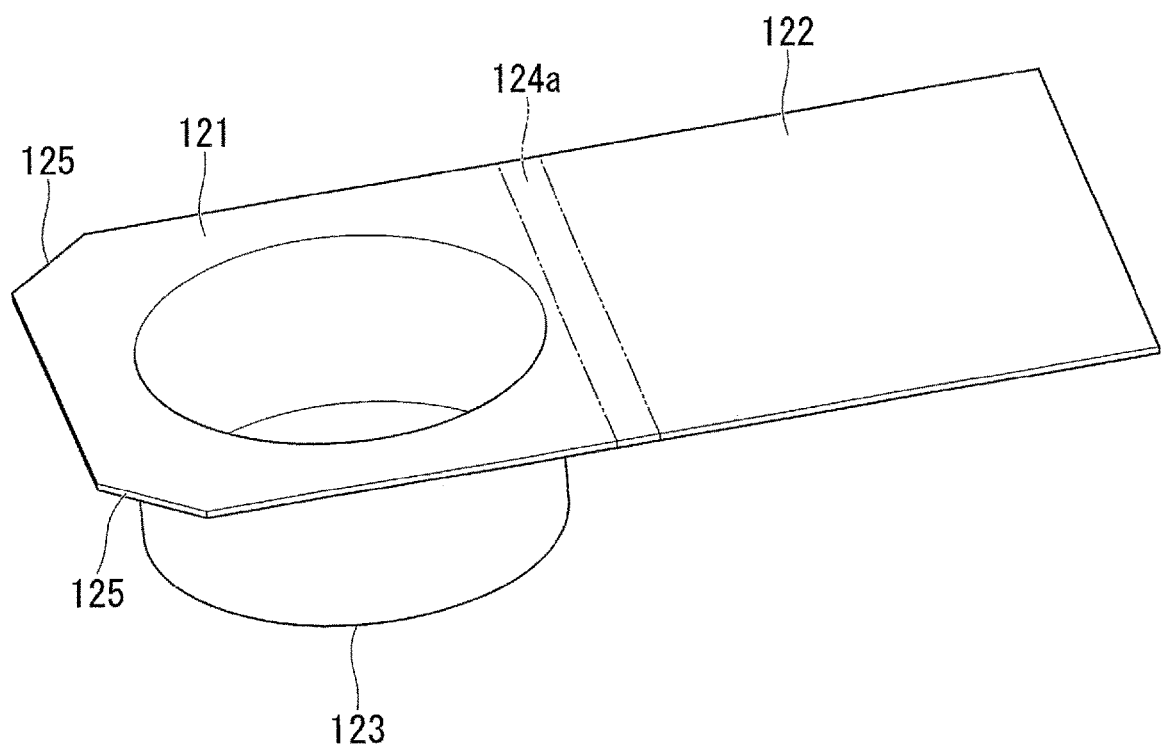
FIG. 10 is a perspective view of a first sheet and a second sheet according to the second embodiment.

FIG. 8 is a plan view of the battery according to the second embodiment, and FIG. 9 is a side view of the battery according to the second embodiment. FIG. 10 is a perspective view of the first sheet and the second sheet according to the second embodiment.

In the first embodiment illustrated in FIGS. 3 and 4, the first sheet 21 and the second sheet 22 are provided to be separated from each other. Meanwhile, the second embodiment illustrated in FIG. 10 is different from the first embodiment in that a first sheet 121 (first member) and a second sheet 122 (second member) are formed to be integrated with each other. In addition, a configuration similar to that of the first embodiment illustrated in FIGS. 1 to 5, will be given the same reference numerals, and a specific description thereof will be omitted.

As illustrated in FIG. 8, the battery 101 is provided with an external body 120 in which the electrode body 10 is accommodated. The external body 120 is formed by overlapping the first sheet 121 and the second sheet 122 which are formed of the laminate film to be integrated with each other. The external body 120 is provided with a cylindrical accommodation portion 123 and a circumferential edge portion 124 having a shape of a rectangular frame in which the first sheet 121 and the second sheet 122 overlap each other around the accommodation portion 123.

As illustrated in FIG. 10, the first sheet 121 and the second sheet 122 are formed of one laminate film. Specifically, as illustrated in FIG. 9, the first sheet 121 and the second sheet 122 are continuous and folded back on one end side 124*a* of the circumferential edge portion 124.

As illustrated in FIG. 8, in the first sheet 121 in the circumferential edge portion 124, one pair of cutout portions 125 are formed. The one pair of cutout portions 125 nip the accommodation portion 123 in the circumferential edge portion 124, and are respectively formed in the one pair of adjacent angle portions positioned on a side opposite to the one end side 124*a*.

In this manner, since the first sheet 121 and the second sheet 122 are formed to be integrated with each other, it is possible to reduce the number of components, and to achieve the battery 101 at low costs.

In addition, the one end side 124*a* of the circumferential edge portion 124 becomes a folding-back portion in which the first sheet 121 and the second sheet 122 are continuously connected to each other. Therefore, it is possible to prevent the leak path which communicates with the inside of the accommodation portion 123 and the outside of the external body 120 from being formed on the one end side 124a of the circumferential edge portion 124. Therefore, in a region along at least three end sides excluding the one end side 124a of the circumferential edge portion 124, by welding the first sheet 121 and the second sheet 122 to each other, it is possible to prevent the inside of the accommodation portion 123 from being sealed. Therefore, it is possible to simplify a manufacturing process of the battery 101, and to achieve the battery 101 at low costs.

First Modification Example of Second Embodiment

Next, a first modification example of the second embodiment will be described.

Figure 11:
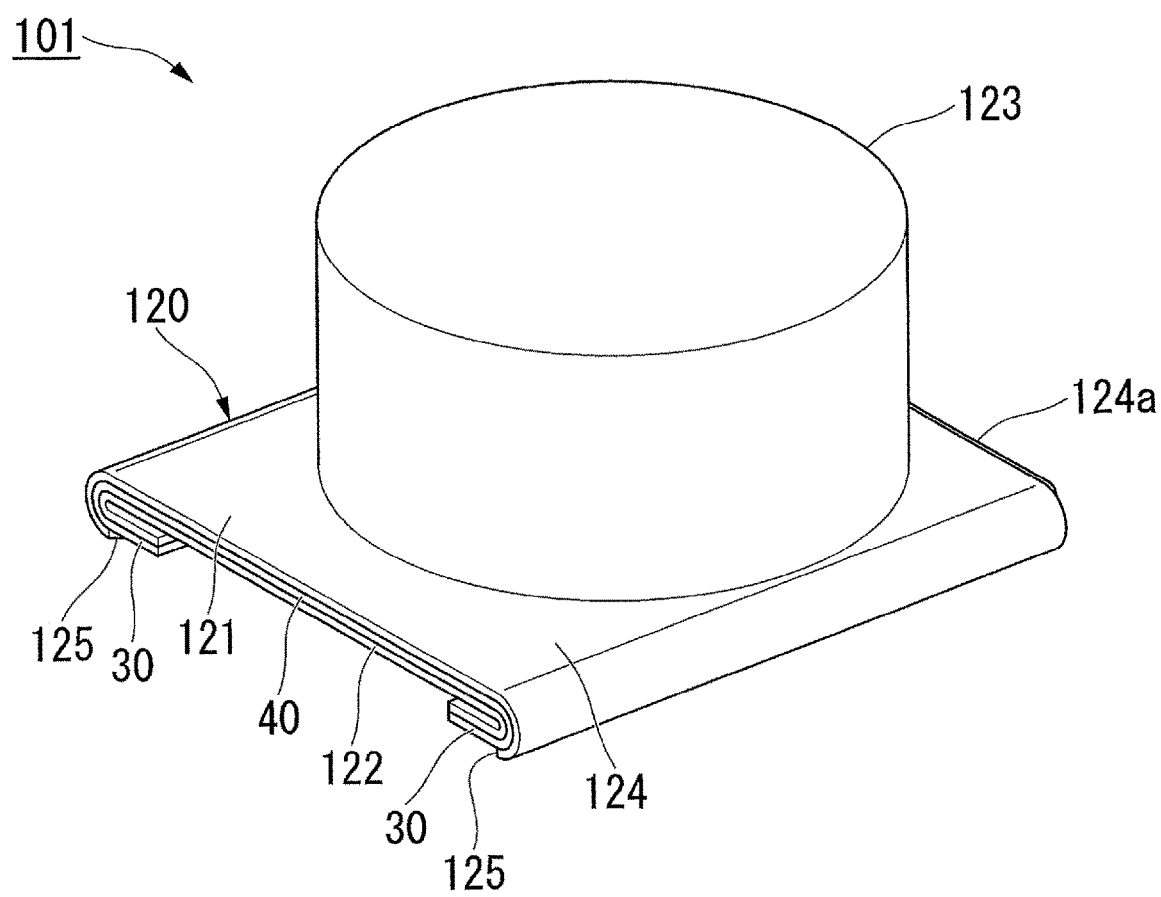
FIG. 11 is a perspective view of a first modification example of the second embodiment.
Figure 12:
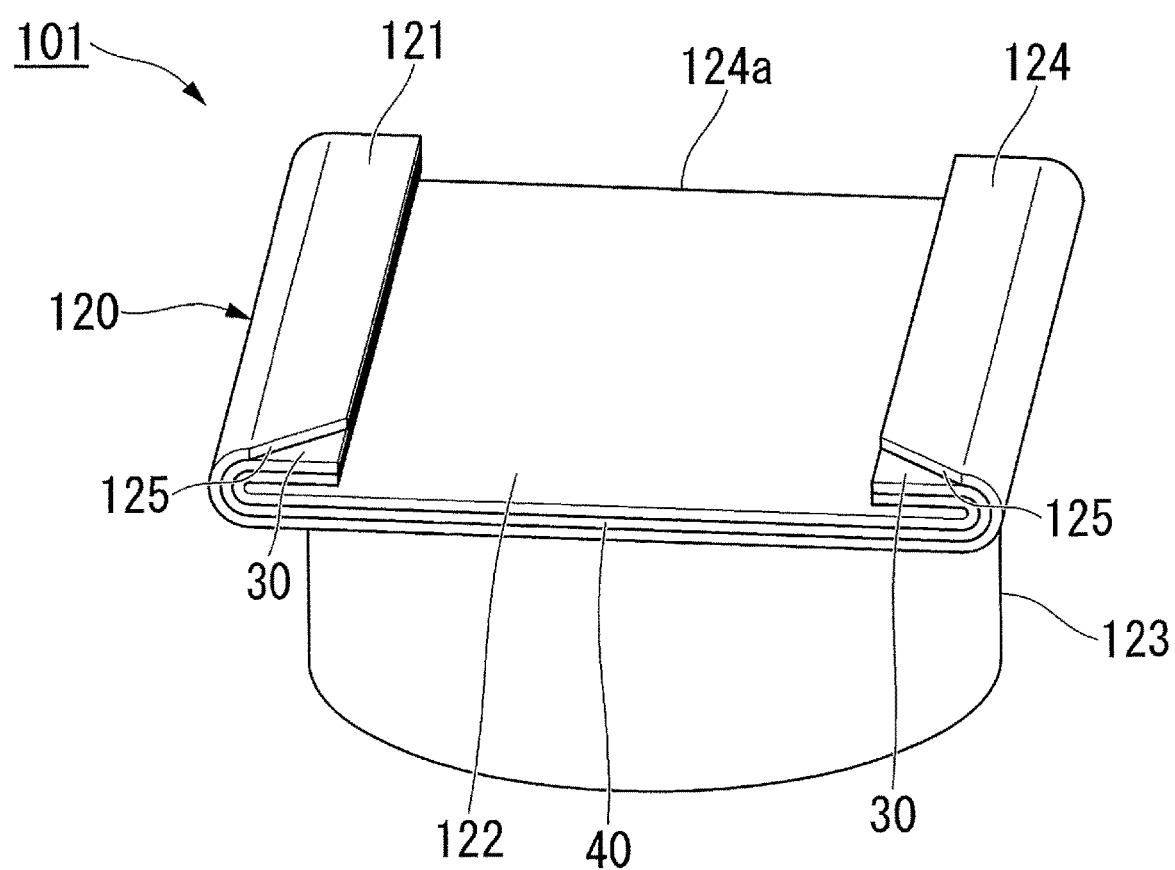
FIG. 12 is a perspective view of the first modification example of the second embodiment.

FIGS. 11 and 12 are perspective views of the first modification example of the second embodiment.

In the second embodiment illustrated in FIG. 8, the circumferential edge portion 24 is formed to be flat. Meanwhile, the first modification example of the second embodiment illustrated in FIG. 11 is different from the second embodiment in that the circumferential edge portion 124 is folded back. In addition, a configuration similar to that of the second embodiment illustrated in FIGS. 8 to 10 will be given the same reference numerals, and a specific description thereof will be omitted.

As illustrated in FIGS. 11 and 12, the circumferential edge portion 124 is folded back by approximately 180° toward the side opposite to the accommodation portion 123 in the direction in which the first sheet 121 and the second sheet 122 overlap each other. In the embodiment, in the circumferential edge portion 124, a part which is along one pair of end sides connected in both ends of the one end side 124a is folded back.

According to the configuration, it is possible to reduce the size of the external shape of the circumferential edge portion 124 when viewed from the direction in which the first sheet 121 and the second sheet 122 overlap each other. Therefore, it is possible to reduce the size of the external shape of the external body 120, and to achieve the battery 101 having high energy density.

Furthermore, the strength of the circumferential edge portion 124 is improved by being folded back. Therefore, when the electricity is taken out by bringing a lead line or the like into contact with the electrode terminal 30 which is exposed to the outside in the angle portion of the folded-back circumferential edge portion 124, it is possible to prevent the electrode terminal 30 from being displaced to escape from the lead line or the like. Therefore, it is possible to improve the reliability of a function as an external terminal of the battery 101.

Second Modification Example of Second Embodiment

Next, a second modification example of the second embodiment will be described.

Figure 13:
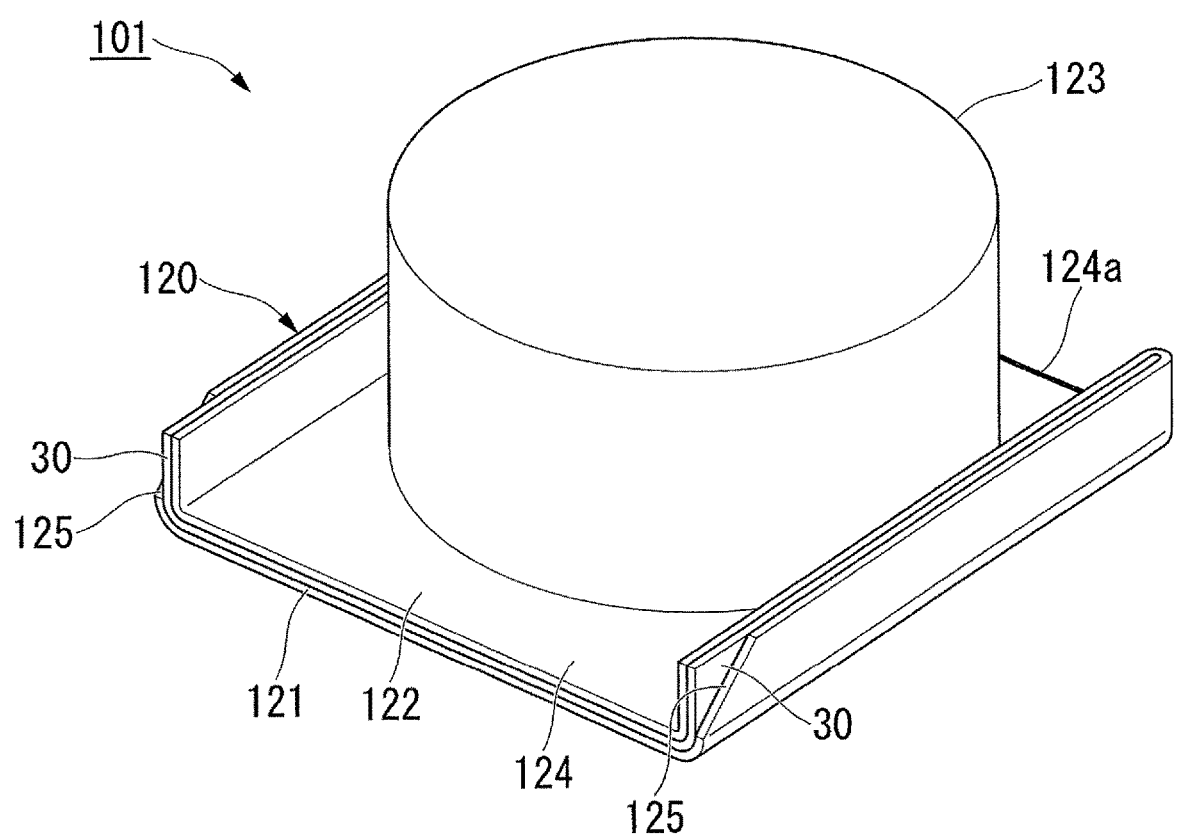
FIG. 13 is a perspective view of a second modification example of the second embodiment.

FIG. 13 is a perspective view of the second modification example of the second embodiment.

In the second embodiment illustrated in FIG. 8, the circumferential edge portion 24 is formed to be flat. Meanwhile, the second modification example of the second embodiment illustrated in FIG. 13 is different from the second embodiment in that the circumferential edge portion 24 is bent. In addition, a configuration similar to that of the second embodiment illustrated in FIGS. 8 to 10 will be given the same reference numerals, and a specific description thereof will be omitted.

As illustrated in FIG. 13, the circumferential edge portion 124 is bent approximately by 90° toward the accommodation portion 123 side. In the embodiment, in the circumferential edge portion 124, a part which is along the one pair of end sides which are connected in both ends of the one end side 124a is bent.

According to the configuration, it is possible to reduce the size of the external shape of the circumferential edge portion 124 when viewed from the direction in which the first sheet 121 and the second sheet 122 overlap each other. Therefore, it is possible to reduce the size of the external shape of the external body 120, and to achieve the battery 101 having high energy density.

Furthermore, the strength of the circumferential edge portion 124 is improved by being bent. Therefore, when the electricity is taken out by bringing the lead line or the like into contact with the electrode terminal 30 which is exposed to the outside in the angle portion of the bent circumferential edge portion 124, it is possible to prevent the electrode terminal 30 from being displaced to escape from the lead line or the like. Therefore, it is possible to improve the reliability of a function as an external terminal of the battery 101.

Third Embodiment

Next, a battery 201 of a third embodiment will be described.

Figure 14:
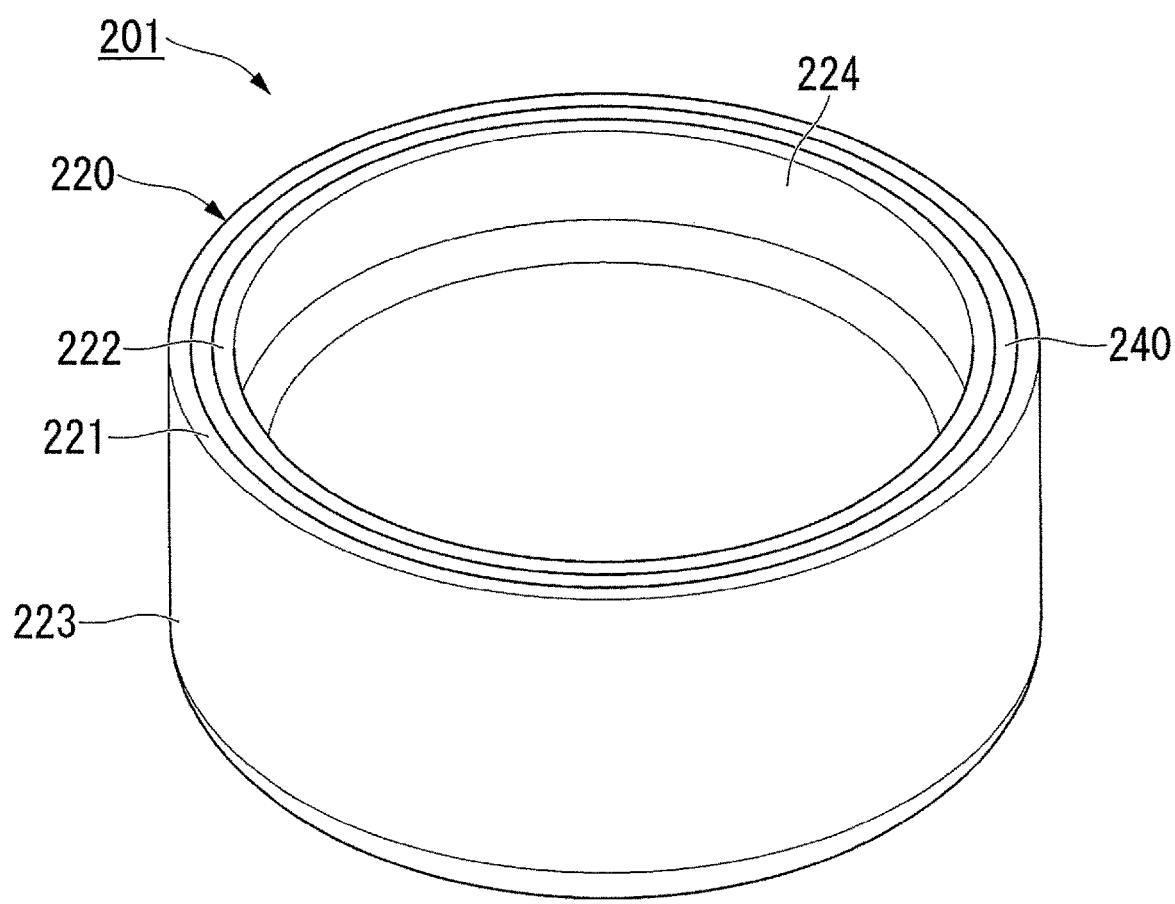
FIG. 14 is a perspective view of a battery according to a third embodiment.
Figure 15:
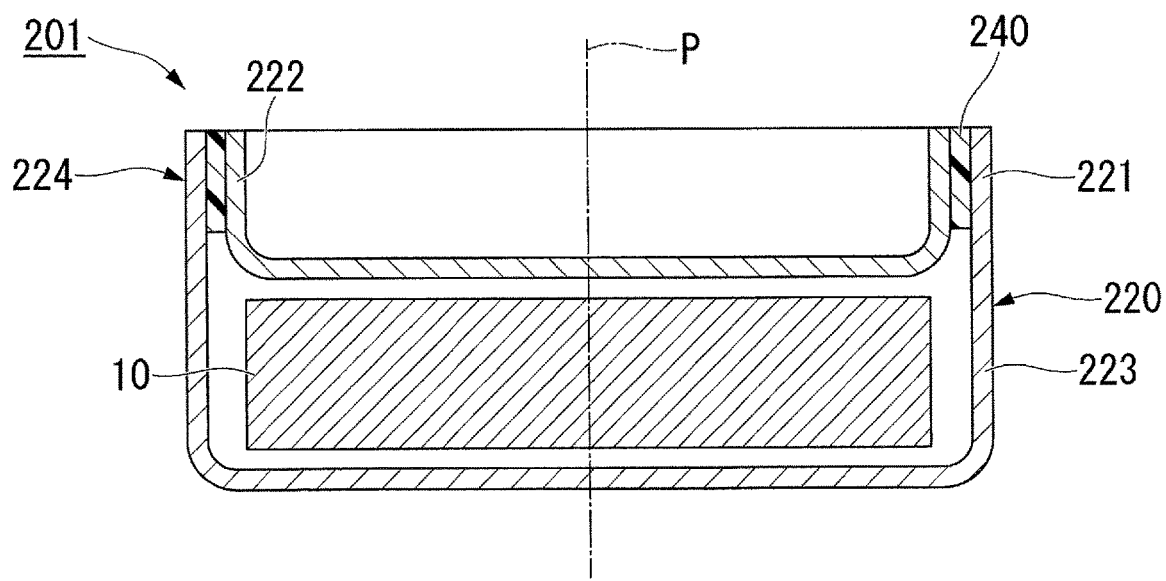
FIG. 15 is a longitudinal sectional view of the battery according to the third embodiment.

FIG. 14 is a perspective view of the battery according to the third embodiment. FIG. 15 is a longitudinal sectional view of the battery according to the third embodiment.

In the first embodiment illustrated in FIG. 1, the circumferential edge portion 24 extends to be along the radial direction of the accommodation portion 23. Meanwhile, the third embodiment illustrated in FIG. 14 is different from the first embodiment in that a circumferential edge portion 224 extends to be along the shaft direction of the center shaft of an accommodation portion 223. In addition, a configuration similar to that of the first embodiment illustrated in FIGS. 1 to 5 will be given the same reference numerals, and a specific description thereof will be omitted.

As illustrated in FIGS. 14 and 15, the battery 201 is provided with an external body 220 in which the electrode body 10 is accommodated.

As illustrated in FIG. 14, the external body 220 is formed by overlapping a first sheet 221 (first member) and a second sheet 222 (second member) which are formed of the laminate film. The external body 220 includes a cylindrical accommodation portion 223, and a circumferential edge portion 224 in which the first sheet 221 and the second sheet 222 overlap each other around the accommodation portion 223.

As illustrated in FIG. 15, the first sheet 221 is formed in a bottomed cylindrical shape. In the first sheet 221, the bottomed cylindrical accommodation portion 223 is formed. The accommodation portion 223 becomes a part which is further on the bottom portion side than the intermediate part in the center shaft direction in the first sheet 221. A dimension of an inner side of the accommodation portion 223 in the center shaft direction becomes, for example, approximately 1.87 mm or 2.87 mm. In addition, an inner diameter of the accommodation portion 223 becomes, for example, approximately 11 mm.

The second sheet 222 is formed in a bottomed cylindrical shape, and is inserted into the first sheet 221 from the bottom portion side. The center shaft of the second sheet 222 is disposed to match the center shaft of the first sheet 221. In the center shaft direction of the first sheet 221 and the second sheet 222, an opening end edge of the first sheet 221 and an opening end edge of the second sheet 222 are positioned at the same position.

The circumferential edge portion 224 extends toward a side separated from the accommodation portion 223 along the center shaft direction of the accommodation portion 223 from an opening portion of the accommodation portion 223. In the center shaft direction of the accommodation portion 223, a dimension of the circumferential edge portion 224 becomes, for example, approximately 1.5 mm, or approximately 2.5 mm. Between the first sheet 221 and the second sheet 222 in the circumferential edge portion 224, a sealant film 240 is disposed across the entire circumference to surround the accommodation portion 223. Similar to the sealant film 40 in the first embodiment, the sealant film 240 is formed by overlapping one pair of films formed of the thermoplastic resin, and nips one pair of electrode terminals which are not illustrated. The sealant film 240 is formed in a cylindrical shape which corresponds to the circumferential edge portion 224. The sealant film 240 is fixed in a state of being welded to the first sheet 221 and the second sheet 222.

According to the configuration, since it is possible to provide a space surrounded by the circumferential edge portion 224, it is possible to dispose a protection circuit or the like of the battery 201 in the space. In addition, it is also possible to use the space surrounded by the circumferential edge portion 224 as a gas holder.

In addition, in the third embodiment, it is preferable that the first sheet 221 and the second sheet 222 use members having strengths different from each other. Specifically, first, it is possible to configure the first sheet 221 and the second sheet 222 by materials different from each other. For example, by using a laminate film made of stainless steel as the first sheet 221, it is possible to use an aluminum laminate film as the second sheet 222.

In addition, it is also possible to change the strength of the member according to a change in thickness of the first sheet 221 and the second sheet 222. For example, the thickness of the first sheet 221 can be 150 μm, and the thickness of the second sheet 222 can be 100 μm. The thicknesses of the first sheet 221 and the second sheet 222 can be appropriately set in a range where an action effect which will be described later is achieved.

Accordingly, in a case where the external body 220 is deformed by a pressure caused by gas generated in the battery, by concentrating deformations in any laminate film that configures the external body 220, it is also possible to prevent the dimension of the outer diameter of the battery from being influenced.

Fourth Embodiment

Next, a battery 301 of a fourth embodiment will be described.

Figure 16:
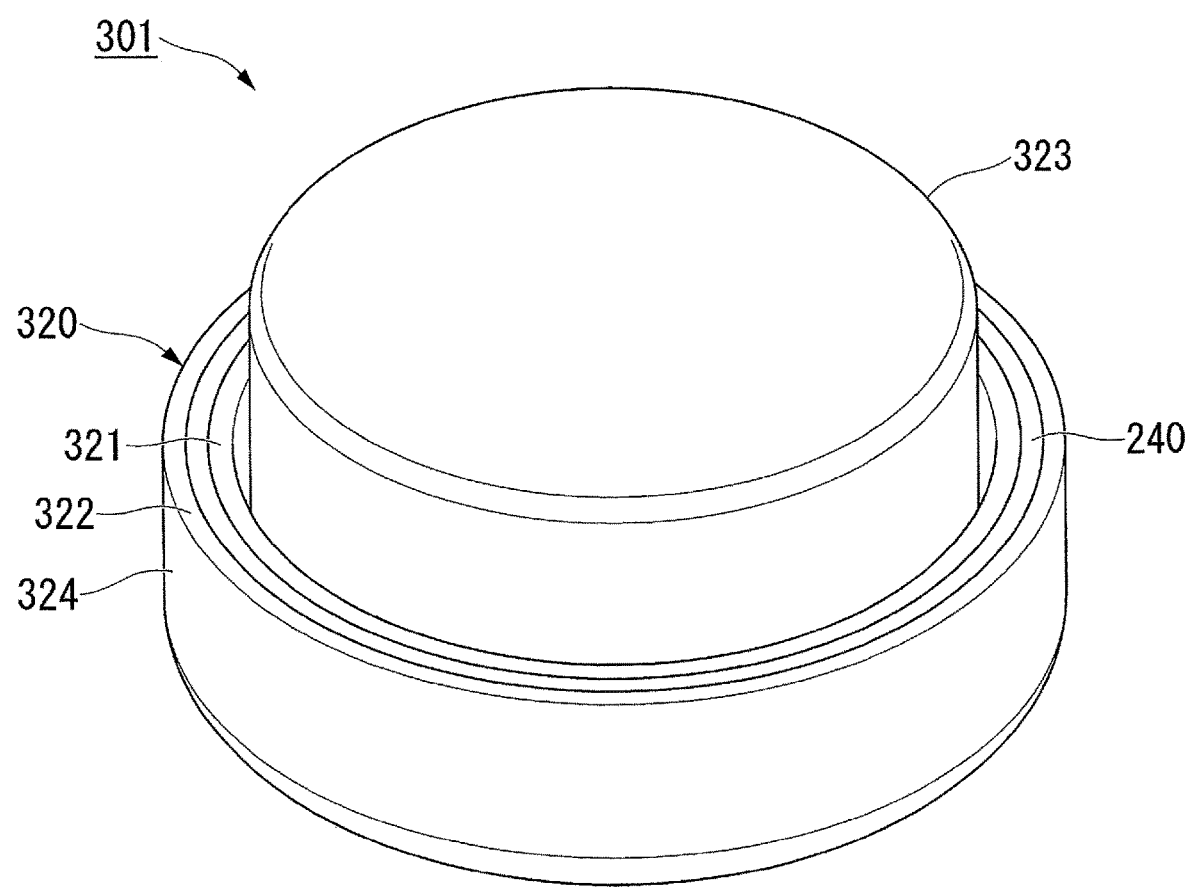
FIG. 16 is a perspective view of a battery according to a fourth embodiment.
Figure 17:
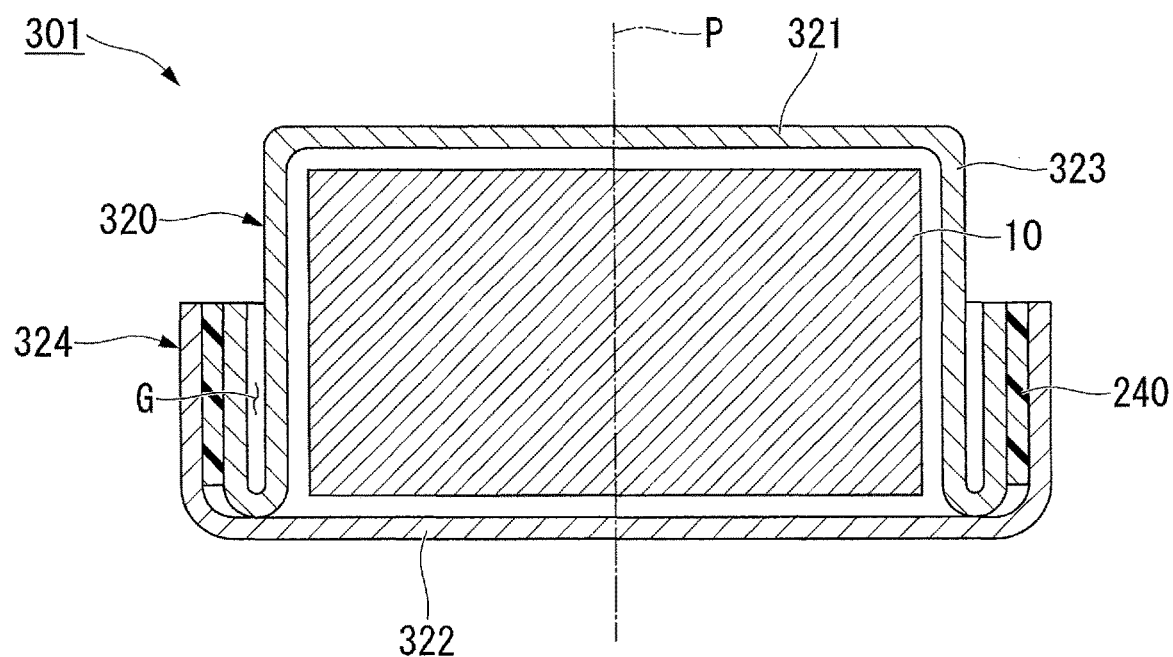
FIG. 17 is a longitudinal sectional view of the battery according to the fourth embodiment.

FIG. 16 is a perspective view of the battery according to the fourth embodiment, and FIG. 17 is a longitudinal sectional view of the battery according to fourth embodiment.

In the third embodiment illustrated in FIG. 14, the circumferential edge portion 224 extends toward the direction of being separated from the accommodation portion 223 along the center shaft direction of the accommodation portion 223. Meanwhile, the fourth embodiment illustrated in FIG. 16 is different from the third embodiment in that a circumferential edge portion 324 is disposed to be along the outer circumferential surface of an accommodation portion 323. In addition, a configuration similar to that of the third embodiment illustrated in FIGS. 14 and 15 will be given the same reference numerals, and a specific description thereof will be omitted.

As illustrated in FIGS. 16 and 17, the battery 301 is provided with an external body 320 in which the electrode body 10 is accommodated.

As illustrated in FIG. 16, the external body 320 is formed by overlapping a first sheet 321 (first member) and a second sheet 322 (second member) which are formed of the laminate film. The external body 320 includes the cylindrical accommodation portion 323, and the circumferential edge portion 324 in which the first sheet 321 and the second sheet 322 overlap each other around the accommodation portion 323.

As illustrated in FIG. 17, in the first sheet 321, the bottomed cylindrical accommodation portion 323 is formed. A dimension of an inner side of the accommodation portion 323 in the center shaft direction becomes, for example, approximately 4.8 mm or 5.2 mm.

The circumferential edge portion 324 extends toward the outer side of the accommodation portion 323 in the radial direction from the opening portion of the accommodation portion 323, and further, extend along the outer circumferential surface of the accommodation portion 323 toward the bottom portion side of the accommodation portion 323 along the center shaft direction of the accommodation portion 323. A space G is provided between the circumferential edge portion 324 and the outer circumferential surface of the accommodation portion 323. The sealant film 240 is disposed between the first sheet 321 and the second sheet 322 in the circumferential edge portion 324. The sealant film 240 is fixed in a state of being welded to the first sheet 321 and the second sheet 322. It is preferable that a dimension in the center shaft direction of a region in which the first sheet 321 and the second sheet 322 are welded is, for example, equal to or greater than 2 mm.

Here, in the fourth embodiment, it is preferable that the first sheet 321 and the second sheet 322 use a member having strengths different from each other. Specifically, first, it is possible to configure the first sheet 321 and the second sheet 322 by materials different from each other. For example, by using the laminate film made of stainless steel in the first sheet 321, it is possible to use aluminum laminate film in the second sheet 322.

In addition, it is also possible to change the strength of the member according to a change in thickness of the first sheet 321 and the second sheet 322. For example, the thickness of the first sheet 321 can be 100 μm, and the thickness of the second sheet 322 can be 150 μm. Otherwise, in the first sheet 321, the bottom portion has the same thickness as that of the second sheet 322, and a part vertical to the bottom portion can be thinner than the second sheet 322. The thickness of the first sheet 321 and the second sheet 322 can be appropriately set in a range where an action effect which will be described later is achieved.

Accordingly, in a case where the external body 320 is deformed by a pressure caused by gas generated in the battery, by concentrating deformations in any laminate film that configures the external body 320, it is also possible to prevent the dimension of the outer diameter of the battery from being influenced.

Hereinafter, a manufacturing method of the external body 320 in a manufacturing method of the battery 301 of the embodiment will be described. In addition, refer to FIGS. 16 and 17 for reference numerals of each configuration component of the battery 301 in the following description.

Figure 18:
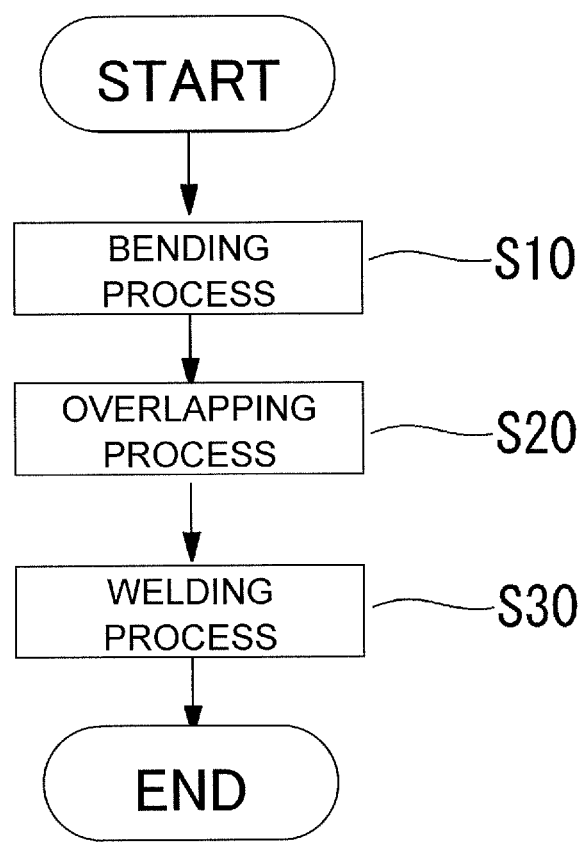
FIG. 18 is a flowchart illustrating a manufacturing method of an external body according to the fourth embodiment.
Figure 19:
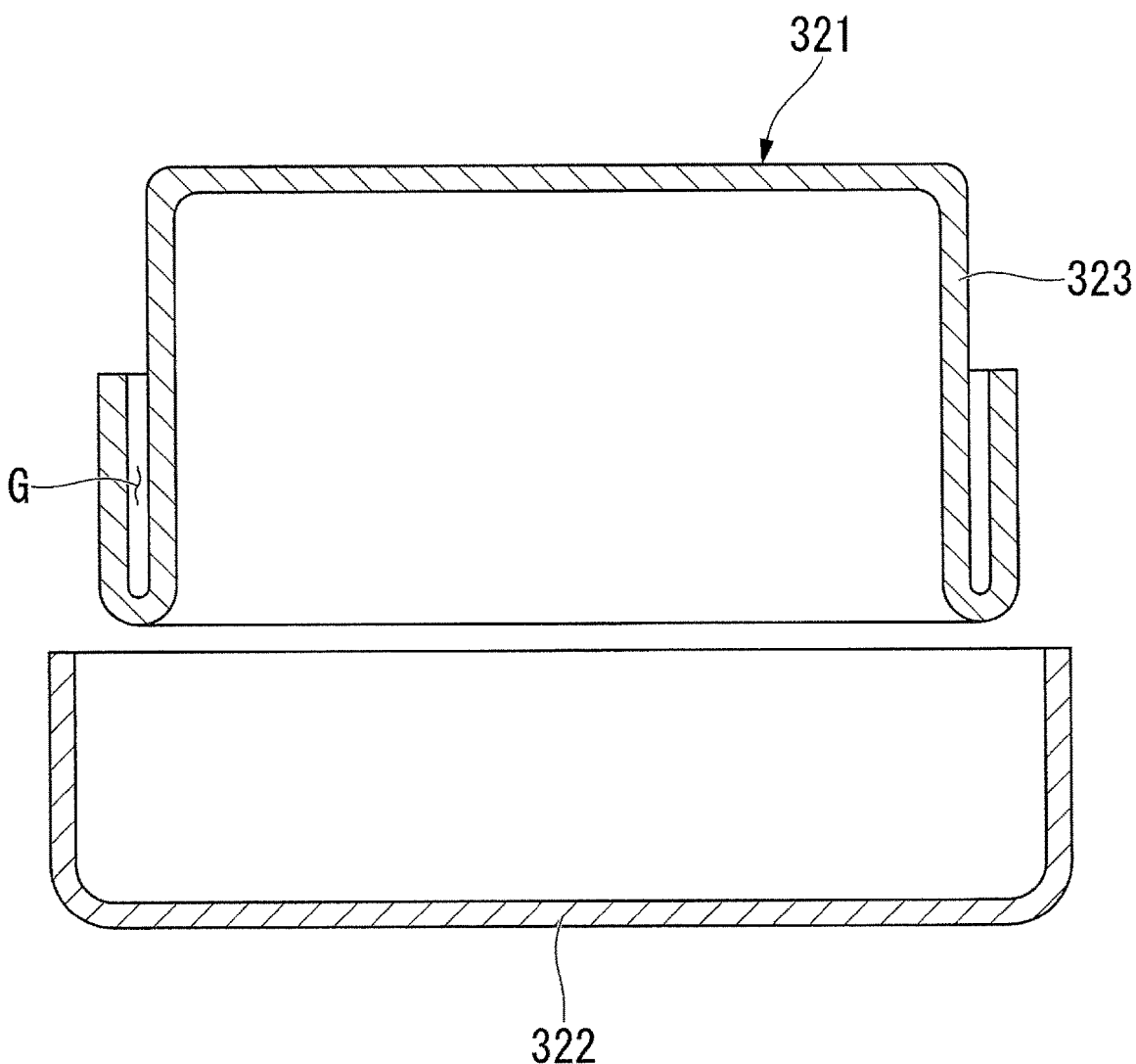
FIG. 19 is a process view illustrating the manufacturing method of the external body according to the fourth embodiment, and is a sectional view which corresponds to FIG. 17.
Figure 20:
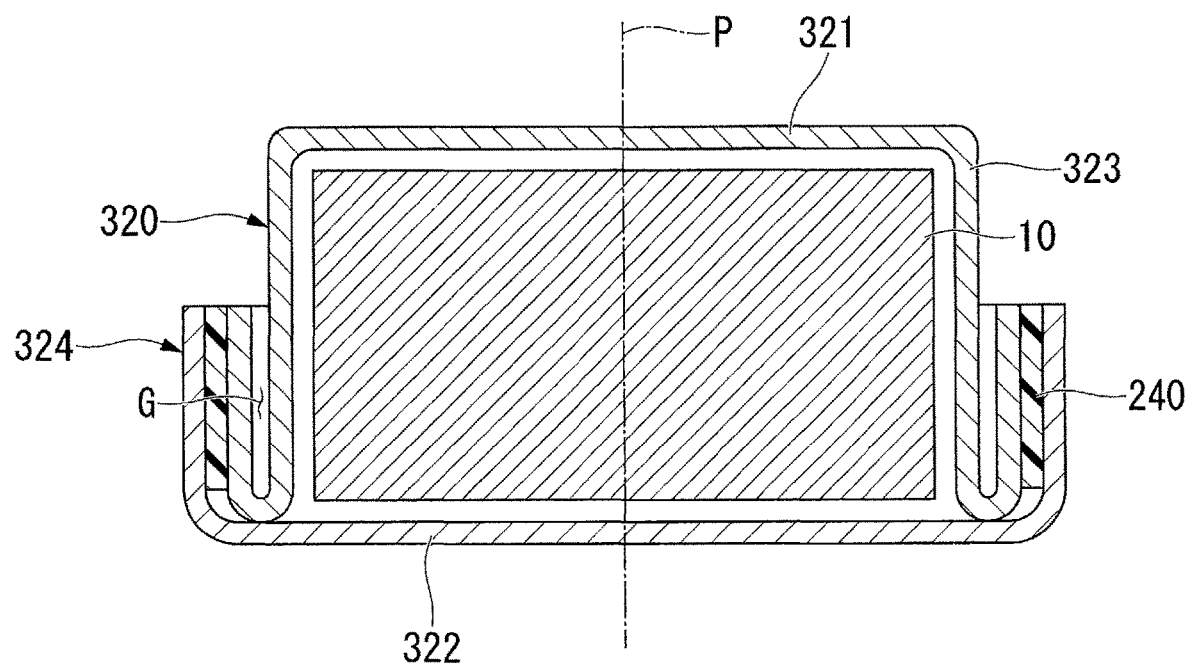
FIG. 20 is a process view illustrating the manufacturing method of the external body according to the fourth embodiment, and is a sectional view which corresponds to FIG. 17.
Figure 21:
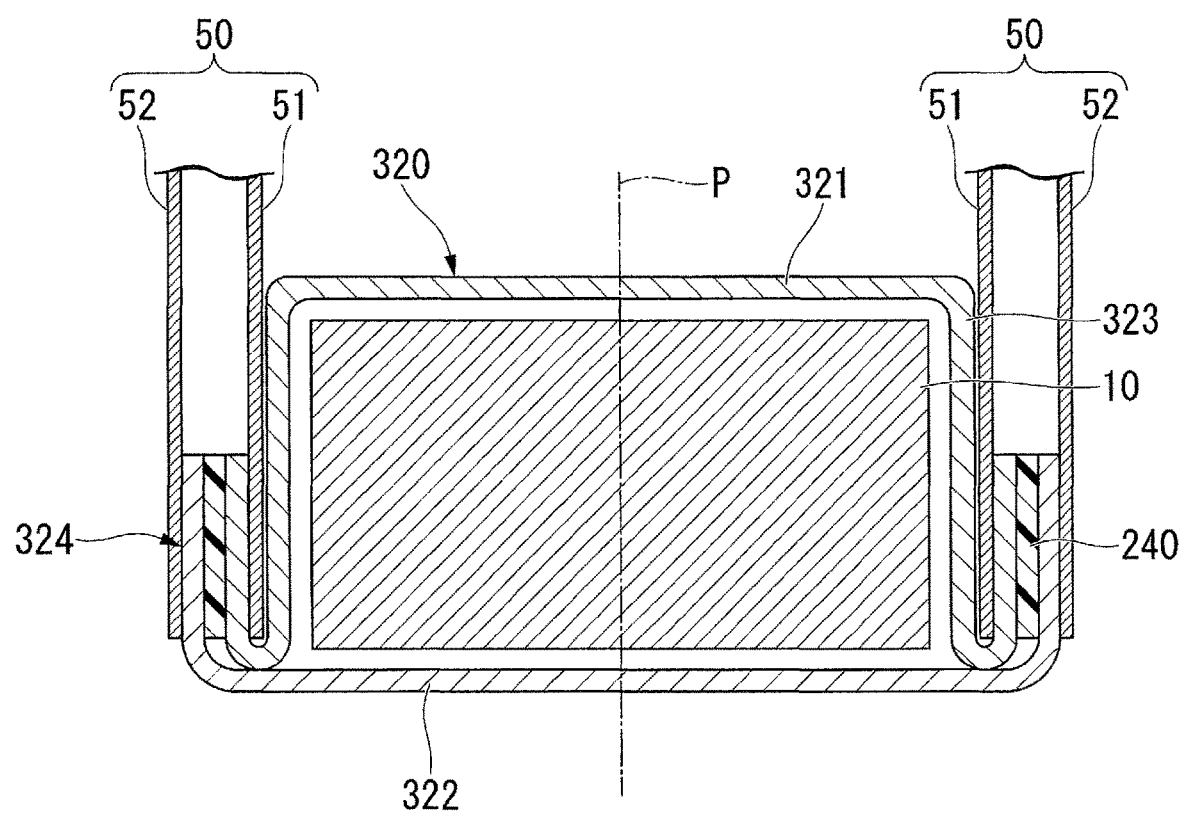
FIG. 21 is a process view illustrating the manufacturing method of the external body according to the fourth embodiment, and is a sectional view which corresponds to FIG. 17.

FIG. 18 is a flowchart illustrating the manufacturing method of the external body according to the fourth embodiment. FIGS. 19 to 21 are process views illustrating the manufacturing method of the external body according to the fourth embodiment, and are sectional views that correspond to FIG. 17.

As illustrated in FIG. 18, the manufacturing method of the external body 320 includes a bending process S10 of forming the first sheet 321 and the second sheet 322 by performing the drawing processing to the laminate film, an overlapping process S20 of overlapping the first sheet 321 and the second sheet 322 which are formed in the bending process S10, and a welding process S30 of welding the first sheet 321 and the second sheet 322.

First, the bending process S10 is performed. In the bending process S10, the first sheet 321 and the second sheet 322 are formed.

Specifically, as illustrated in FIG. 19, the bottomed cylindrical accommodation portion 323 is formed by performing the drawing processing with respect to the disk-like laminate film. Furthermore, by bending an overhanging part around the accommodation portion 323 to be along the outer circumferential surface of the accommodation portion 323, a part which corresponds to the circumferential edge portion 324 is formed in the first sheet 321. At this time, the space G is provided between the part which corresponds to the circumferential edge portion 324 in the first sheet 321 and the outer circumferential surface of the accommodation portion 323. Accordingly, the first sheet 321 is formed. In addition, by bending the outer circumferential part by approximately 90° by performing the drawing processing with respect to the disk-like laminate film, the part which corresponds to the circumferential edge portion 324 in the second sheet 322 is formed. Accordingly, the bottomed cylindrical second sheet 322 is formed.

Next, the overlapping process S20 is performed. In the overlapping process S20, the first sheet 321 and the second sheet 322 overlap each other.

Specifically, as illustrated in FIG. 20, the electrode body 10 is accommodated on the inside of the accommodation portion 323, and in a state where the electrode terminal (not illustrated) and the sealant film 240 are disposed, the second sheet 322 is made to overlap the first sheet 321 to cover an opening of the accommodation portion 323. At this time, the sealant film 240 is nipped between the first sheet 321 and the second sheet 322 in the circumferential edge portion 324.

Next, the welding process S30 is performed. In the welding process S30, the first sheet 321 and the second sheet 322 are welded to each other.

Specifically, as illustrated in FIG. 21, in the welding process S30, by heating means 50, such as, a heater that is heated to a predetermined temperature, the circumferential edge portion 324 is heated by nipping the circumferential edge portion 324 from both surfaces of the circumferential edge portion 324. The heating means 50 is configured of, for example, a cylindrical guide member 51 disposed on the inner side of the circumferential edge portion 324, and a pressing member 52 pressed from the outer side to the circumferential edge portion 324, and nips the circumferential edge portion 324 by the guide member 51 and the pressing member 52. The pressing member 52 may be, for example, a roller, or may have a shape of a plate. As a material of the pressing member 52, a metal material having high thermal conductivity is preferable, and for example, it is possible to use brass or aluminum. In addition, in a case where the pressing member 52 is a roller, in order to ensure sufficient heat capacity by using the welding of the circumferential edge portion 324, it is desirable to make the diameter of the pressing member 52 greater than the diameter of the battery 301. In addition, an elastic member, such as rubber, may be disposed on a front surface of the pressing member 52. Accordingly, when pressing the pressing member 52 to the circumferential edge portion 324, even when the thickness of the circumferential edge portion 324 is nonuniform, it is possible to uniformly press the front surface of the circumferential edge portion 324.

Here, the space G (refer to FIG. 20) is provided between the circumferential edge portion 324 and the accommodation portion 323. Therefore, it is possible to nip the circumferential edge portion 324 by the pressing member 52 by disposing the guide member 51 of the heating means 50 between the circumferential edge portion 324 and the accommodation portion 323. Accordingly, the circumferential edge portion 324 is welded, and the inside of the accommodation portion 323 is sealed.

According to this, the manufacturing of the external body 320 is finished.

In this manner, according to the embodiment, since the circumferential edge portion 324 is disposed to be along the outer circumferential surface of the accommodation portion 323, compared to a configuration in which the circumferential edge portion protrudes along the direction of separating from the accommodation portion, it is possible to reduce the size of the external shape of the external body 320. Therefore, the battery 301 having high energy density is obtained.

Here, in a case of manufacturing the battery 301 which is disposed so that the circumferential edge portion 324 is along the outer circumferential surface of the accommodation portion 323, it is necessary to bend the circumferential edge portion 324 along the outer circumferential surface of the accommodation portion 323. The circumferential edge portion 324 in which the first sheet 321 and the second sheet 322 are welded and integrated with each other, becomes thicker than each of the first sheet 321 and the second sheet 322. Therefore, the circumferential edge portion 324 in which the first sheet 321 and the second sheet 322 are welded and integrated with each other becomes more unlikely to be bent than a case where parts which correspond to the circumferential edge portions 324 of each of the first sheet 321 and the second sheet 322 are separately bent. Furthermore, when the circumferential edge portion 324 in which the first sheet 321 and the second sheet 322 are welded and integrated with each other is bent, a larger load is applied to the circumferential edge portion 324 than that of a case where the parts which correspond to the circumferential edge portions 324 of each of the first sheet 321 and the second sheet 322 are respectively bent.

According to the invention, since the welding process S30 is performed after the bending process S10, it is possible to easily bend the part which corresponds to the circumferential edge portion 324. Therefore, it becomes possible to easily form the external body 320, and to reduce the manufacturing costs. Furthermore, since the welding process S30 is performed after the bending process S10, it is possible to reduce the load applied to the circumferential edge portion 324 to be smaller compared to that of a case where the bending process S10 is performed after the welding process S30, and thus, it is possible to prevent the circumferential edge portion 324 from being damaged, and to prevent quality from deteriorating. Therefore, it is possible to manufacture the battery 301 with high quality and at low costs.

Furthermore, the space G is provided between the circumferential edge portion 324 and the outer circumferential surface of the accommodation portion 323. Therefore, in a case where the welding is performed by pressing the heating means 50, such as the heater, to the circumferential edge portion 324, it is possible to dispose the heating means 50 in the space G between the circumferential edge portion 324 and the accommodation portion 323, and to nip the circumferential edge portion 324 from both surfaces of the circumferential edge portion 324. Accordingly, it is possible to practically heat the circumferential edge portion 324, and to weld the first sheet 321 and the second sheet 322. As a result, it is possible to prevent the leak path which communicates with the inside of the accommodation portion 323 and the outside of the external body 320 from being formed. Therefore, it is possible to further improve the sealability of the inside of the accommodation portion 323, and to further improve the reliability of the battery 301.

Figure 22:
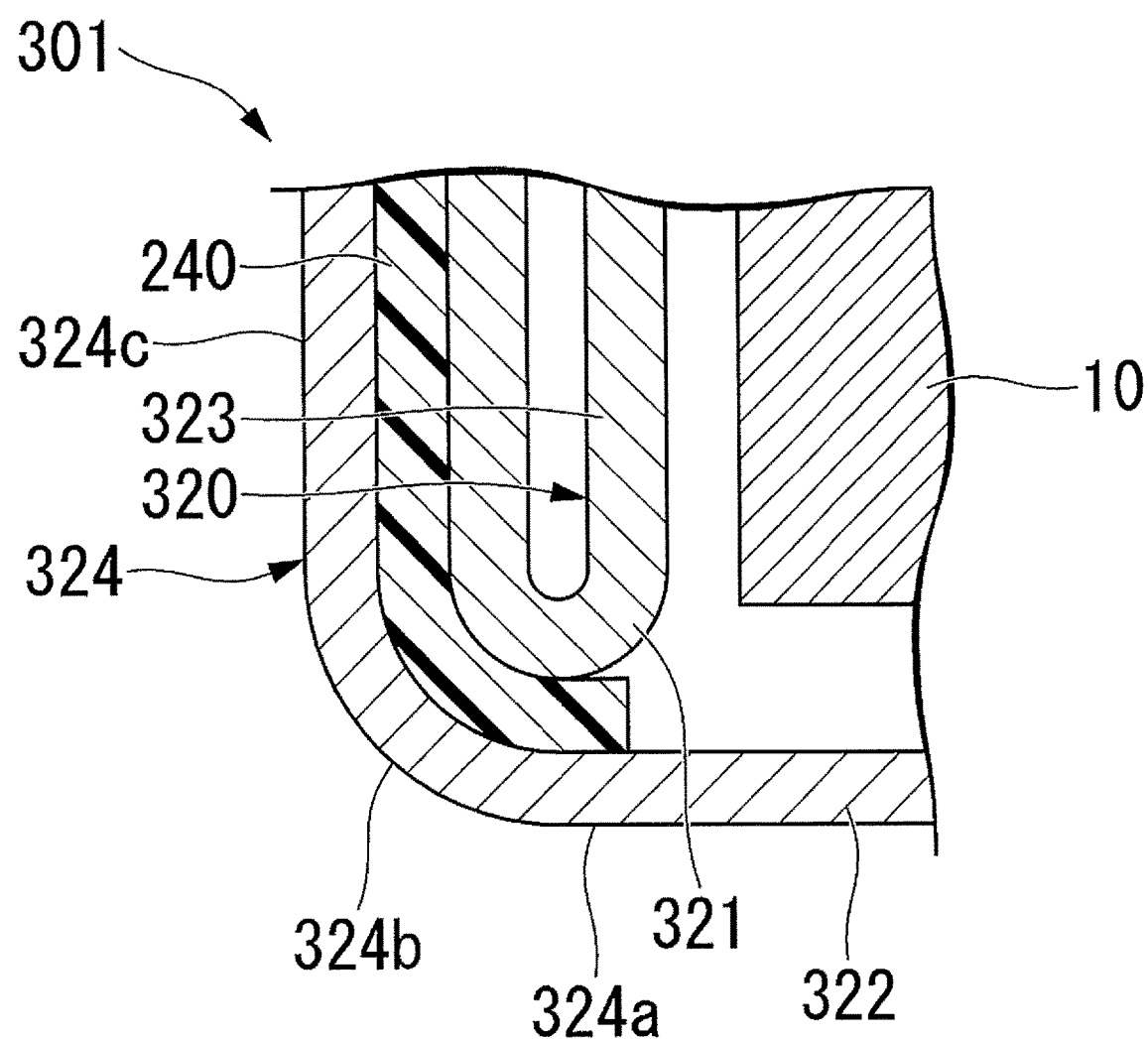
FIG. 22 is a view illustrating a modification example of the manufacturing method of the external body according to the fourth embodiment, and is an enlarged view of a longitudinal section which passes through a center shaft of an accommodation portion.

In addition, in the manufacturing method of the external body 320 according to the embodiment, the welding process S30 is performed after the bending process S10, but the bending process may be performed after the welding process. Specifically, after performing the welding by overlapping one pair of laminate films each other in a state where the electrode terminal (not illustrated) and the sealant film are nipped, the vicinity of the accommodation portion 323 is bent to be along the outer circumferential surface of the accommodation portion 323. FIG. 22 is an enlarged view of the longitudinal section which passes through the center shaft of the accommodation portion. In a case where the bending process is performed after the welding process, as illustrated in FIG. 22, in the circumferential edge portion 324, at least one location among an inner circumferential portion 324a which extends along the radial direction of the accommodation portion 323, an outer circumferential portion 324c which extends along the center shaft direction of the accommodation portion 323, and an intermediate portion 324b which is curved and bent between the inner circumferential portion 324a and the outer circumferential portion 324c, is welded across the entire circumference in the circumferential direction. Accordingly, the inside of the accommodation portion 323 is sealed. In addition, when bending the vicinity of the accommodation portion 323, it is desirable to reduce the weight by heating the vicinity of the accommodation portion 323.

Modification Example of Fourth Embodiment

Next, a battery 401 of a modification example of the fourth embodiment will be described.

Figure 23:
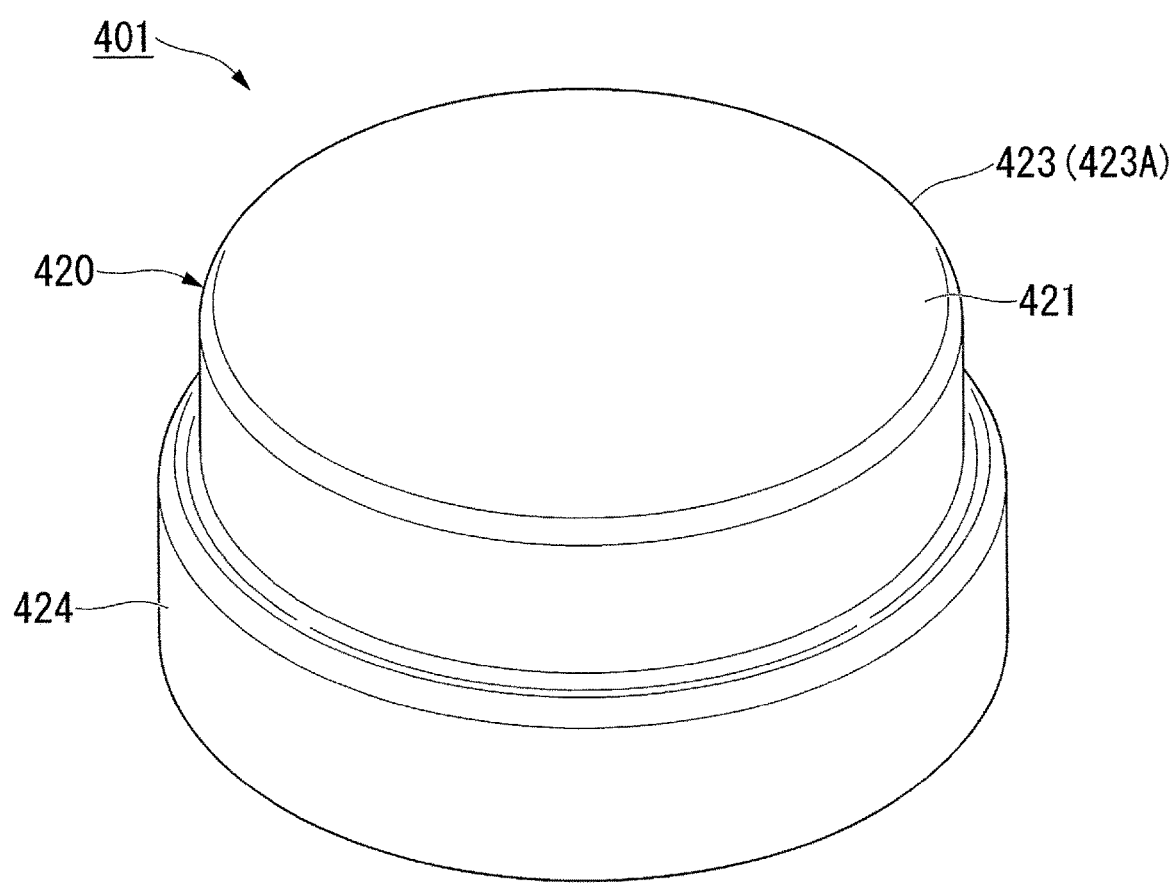
FIG. 23 is a perspective view of a battery according to a modification example of the fourth embodiment.
Figure 24:
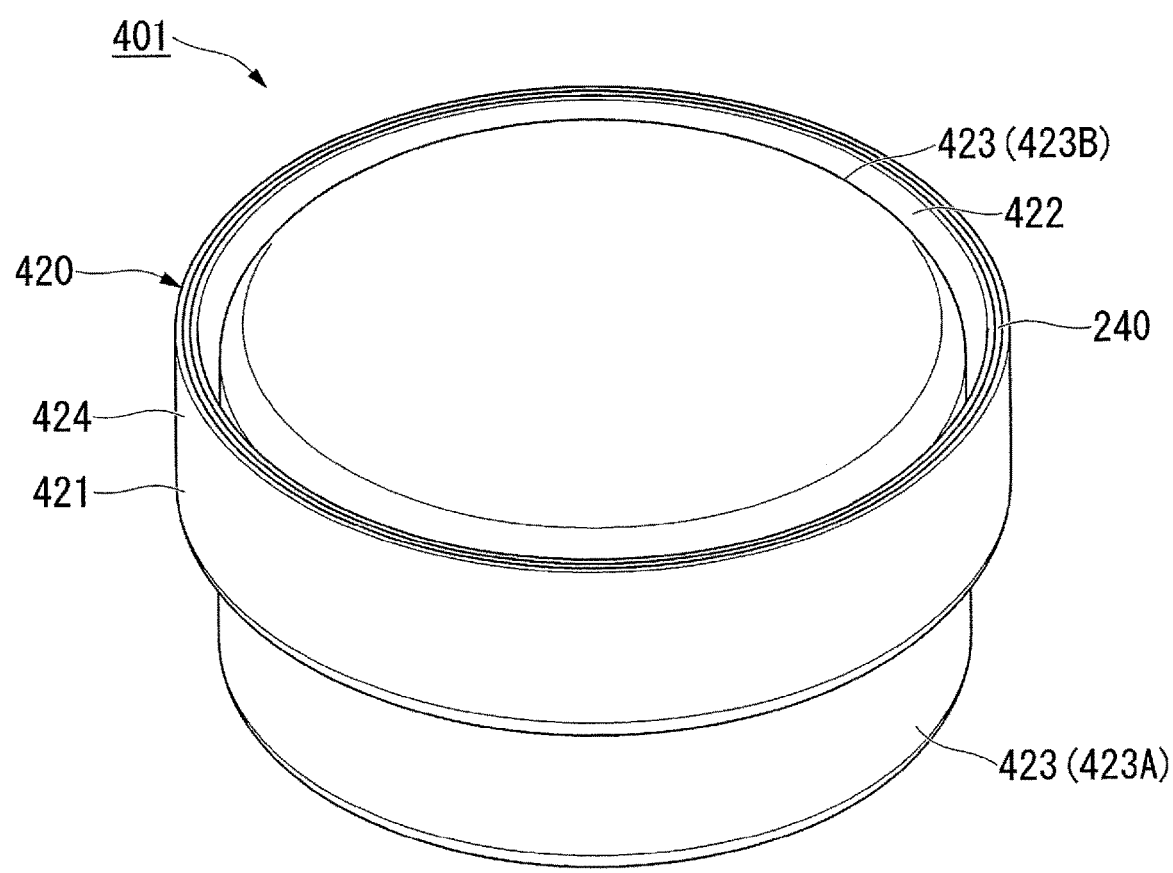
FIG. 24 is a perspective view of the battery according to the modification example of the fourth embodiment.
Figure 25:
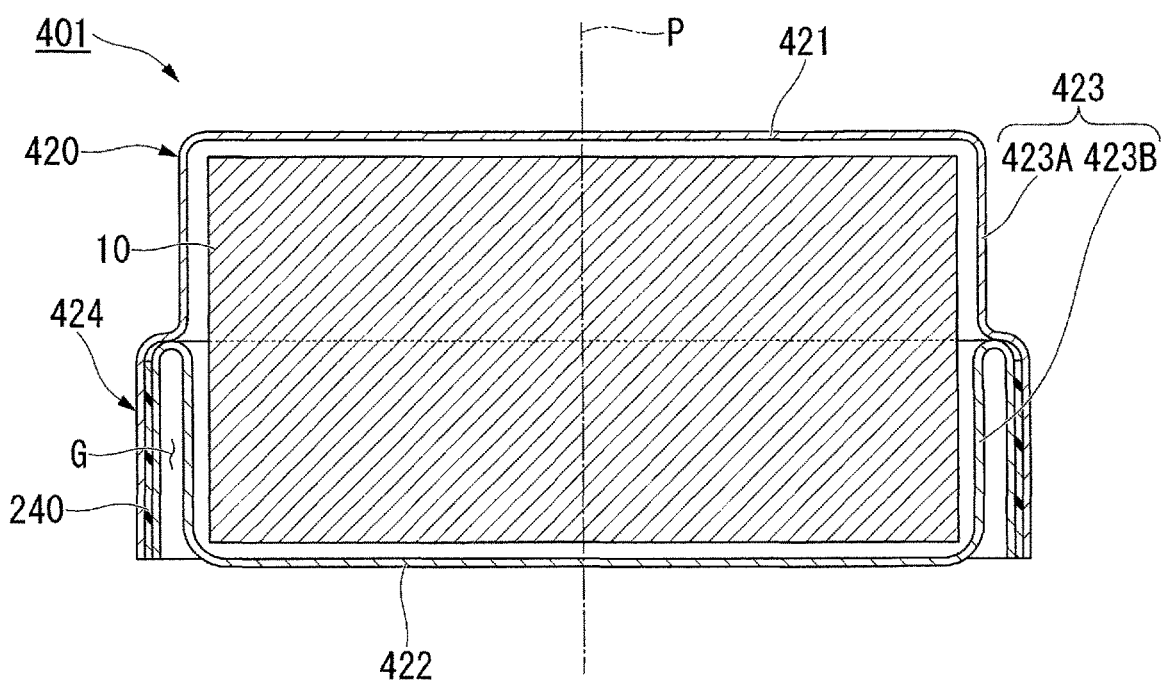
FIG. 25 is a longitudinal sectional view of the battery according to the modification example of the fourth embodiment.

FIGS. 23 and 24 are perspective views of the battery according to the modification example of the fourth embodiment. FIG. 25 is a longitudinal sectional view of the battery according to the modification example of the fourth embodiment.

In the fourth embodiment illustrated in FIG. 17, the accommodation portion 323 is formed in the first sheet 321. Meanwhile, the modification example of the fourth embodiment illustrated in FIG. 25 is different from the fourth embodiment in that an accommodation portion 423 is formed in both of a first sheet 421 (first member) and a second sheet 422 (second member). In addition, a configuration similar to that of the fourth embodiment illustrated in FIGS. 16 and 17 will be given the same reference numerals, and a specific description thereof will be omitted.

As illustrated in FIGS. 23 to 25, the battery 401 is provided with an external body 420 in which the electrode body 10 is accommodated.

As illustrated in FIG. 24, the external body 420 is formed by overlapping the first sheet 421 and the second sheet 422 which are formed of the laminate film. The external body 420 includes the cylindrical accommodation portion 423, and a circumferential edge portion 424 in which the first sheet 421 and the second sheet 422 overlap each other around the accommodation portion 423.

As illustrated in FIG. 25, the cylindrical accommodation portion 423 is formed across both of the first sheet 421 and the second sheet 422. More specifically, in the first sheet 421, one half portion 423A of the bottomed cylindrical accommodation portion 423 is formed, and in the second sheet 422, the other half portion 423B of the bottomed cylindrical accommodation portion 423 is formed. By overlapping opening ends of the one half portion 423A and the other half portion 423B of the cylindrical accommodation portion 423 each other, the cylindrical accommodation portion 423 is formed. A dimension of the inner side of the cylindrical accommodation portion 423 in the center shaft direction becomes, for example, approximately 5.2 mm.

The circumferential edge portion 424 extends along the outer circumferential surface of the accommodation portion 423 toward the bottom portion side of the other half portion 423B of the accommodation portion 423 along the center shaft direction of the accommodation portion 423 from the intermediate portion in the center shaft direction of the accommodation portion 423. A base end portion of the circumferential edge portion 424 becomes a step portion which protrude to the outside of the accommodation portion 423 in the radial direction from the outer circumferential surface of the accommodation portion 423. The space G is provided between the circumferential edge portion 424 and the outer circumferential surface of the accommodation portion 423. The sealant film 240 is disposed between the first sheet 421 and the second sheet 422 in the circumferential edge portion 424. The sealant film 240 is fixed in a state of being welded to the first sheet 421 and the second sheet 422.

The manufacturing method of the external body 420 is similar to the manufacturing method of the external body 320 according to the fourth embodiment. In other words, the manufacturing method of the external body 420 includes the bending process of bending the part which corresponds to the circumferential edge portion 424 of each of the first sheet 421 and the second sheet 422 along the outer circumferential surface of the accommodation portion 423, an overlapping process of overlapping the first sheet 421 and the second sheet 422, and a welding process of welding the circumferential edge portion 424. In addition, the welding process is performed after the bending process. In addition, as described in the fourth embodiment, the bending process may be performed after the welding process.

In this manner, in the modification example, the accommodation portion 423 is formed in both of the first sheet 421 and the second sheet 422. Therefore, compared to a configuration in which the accommodation portion is formed in any one of the first sheet and the second sheet, it is possible to make the depth of the accommodation portions 423 formed in each of the first sheet 421 and the second sheet 422 thin. Accordingly, it is possible to prevent the strength of the first sheet 421 and the second sheet 422 from deteriorating in the accommodation portion 423 formed by the drawing processing. Therefore, it is possible to achieve the battery 401 with high quality.

In addition, the external body 420 configured as described above is formed by inserting the second sheet 422 along the center shaft direction of the accommodation portion 423 from the opening portion side of the other half portion 423B of the accommodation portion 423, on the inner side of the part which corresponds to the circumferential edge portion 424 in the first sheet 421. At this time, the positions which correspond to the step portion of the circumferential edge portion 424 abut against each other in each of the first sheet 421 and the second sheet 422, and movement in the direction in which the first sheet 421 and the second sheet 422 approach each other is regulated. Accordingly, positioning of the second sheet 422 with respect to the first sheet 421 can be performed.

Fifth Embodiment

Next, a battery 501 of a fifth embodiment will be described.

Figure 26:
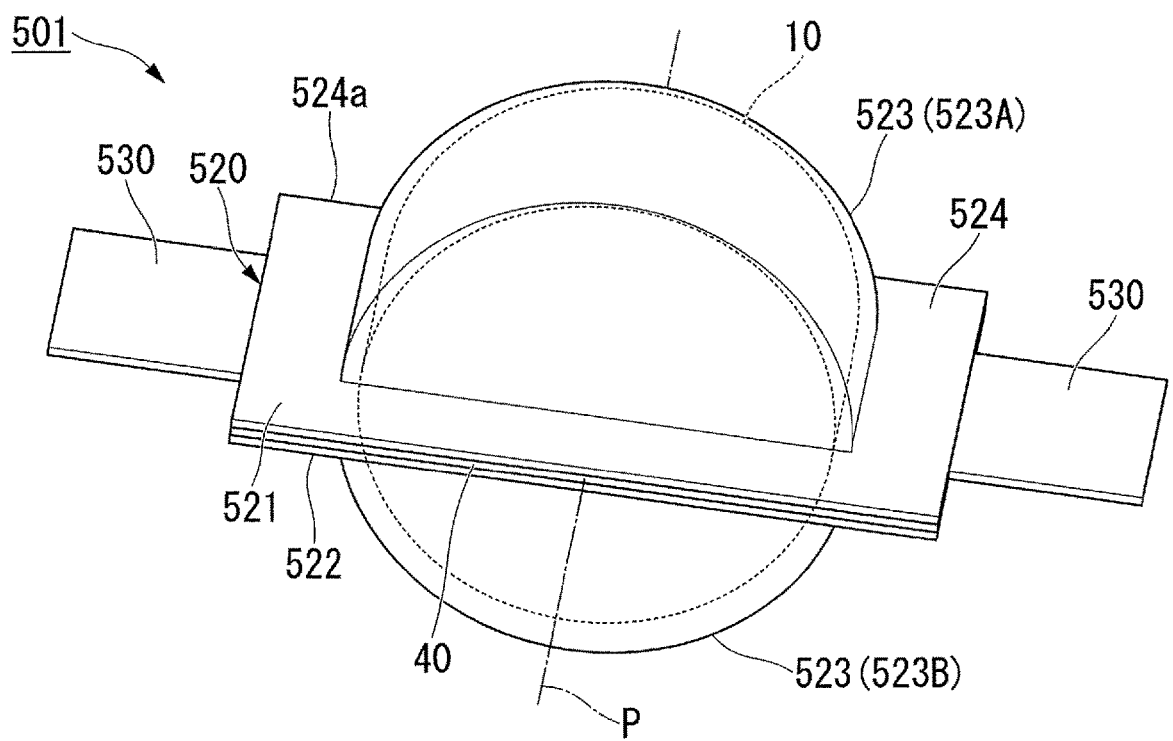
FIG. 26 is a perspective view of a battery according to a fifth embodiment.
Figure 27:
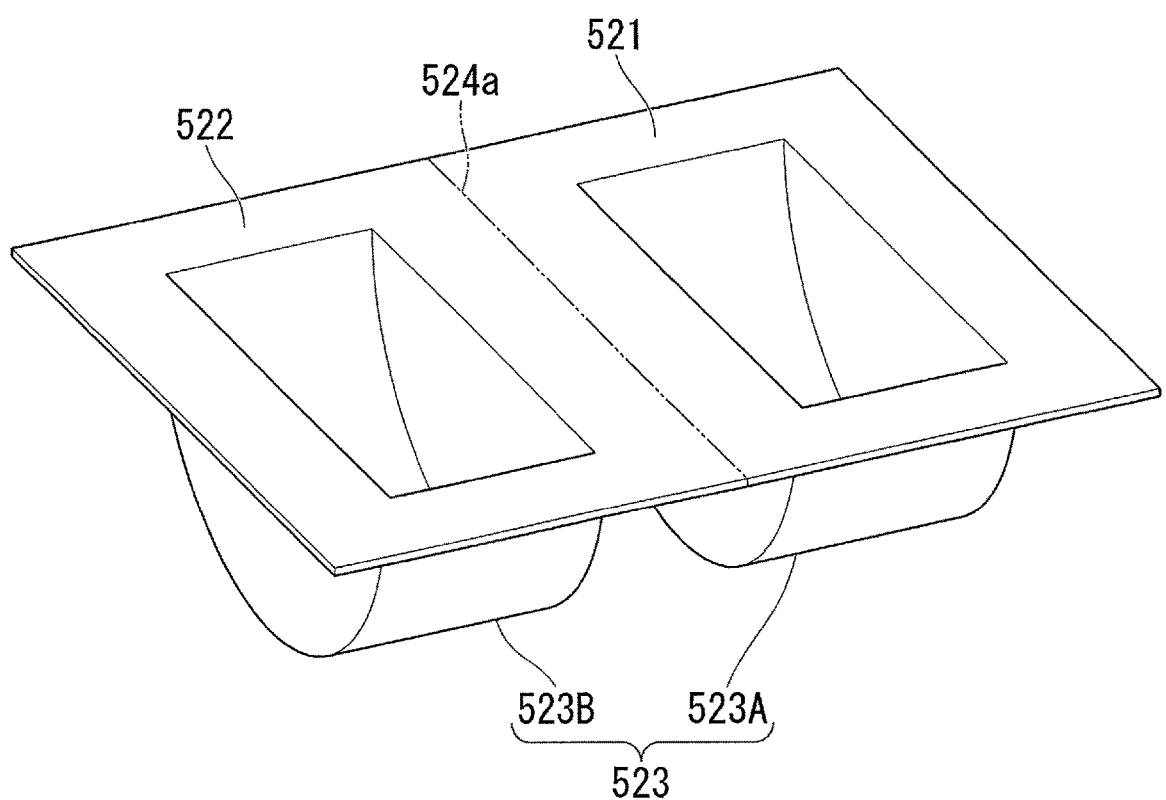
FIG. 27 is a perspective view of a first sheet and a second sheet according to the fifth embodiment.

FIG. 26 is a perspective view of the battery according to the fifth embodiment. FIG. 27 is a perspective view of the first sheet and the second sheet according to the fifth embodiment.

The fifth embodiment illustrated in FIG. 26 is different from each of the above-described embodiments in that a cylindrical accommodation portion 523 is formed in a first sheet 521 (first member) and a second sheet 522 (second member) in a state of being divided in the radial direction. In addition, a configuration similar to that of each of the above-described embodiments will be given the same reference numerals, and a specific description thereof will be omitted.

As illustrated in FIG. 26, the battery 501 is provided with an external body 520 in which the electrode body 10 is accommodated.

The external body 520 is formed by overlapping the first sheet 521 and the second sheet 522 which are integrally formed of the laminate film. The external body 520 includes the cylindrical accommodation portion 523, and a circumferential edge portion 524 in which the first sheet 521 and the second sheet 522 overlap each other around the accommodation portion 523.

The accommodation portion 523 is formed across both of the first sheet 521 and the second sheet 522. More specifically, in the first sheet 521, one half portion 523A of the half-cylindrical accommodation portion 523 is formed, and in the second sheet 522, the other half portion 523B of the half-cylindrical accommodation portion 523 is formed. By overlapping opening ends of the one half portion 523A and the other half portion 523B of the accommodation portion 523 each other, the cylindrical accommodation portion 523 is formed. A dimension of the inner side of the accommodation portion 523 in the center shaft direction becomes, for example, approximately 4.8 mm. A dimension of an outer side of the accommodation portion 523 in the center shaft direction becomes, for example, approximately 5.4 mm. In addition, an outer diameter of the accommodation portion 523 becomes, for example, approximately 11.6 mm. An inner diameter of the accommodation portion 523 becomes, for example, approximately 11 mm.

The circumferential edge portion 524 extends along a virtual plane including the center shaft of the accommodation portion 523. The circumferential edge portion 524 is formed in a shape of a rectangular frame.

Here, the first sheet 521 and the second sheet 522 are formed of one laminate film (refer to FIG. 27). The first sheet 521 and the second sheet 522 are continuously folded back by approximately 180° in one end side 524a positioned on one side in the center shaft direction of the accommodation portion 523 in the circumferential edge portion 524.

The sealant film 40 is disposed between the first sheet 521 and the second sheet 522 in the circumferential edge portion 524. One pair of electrode terminals 530 are nipped between the one pair of films which form the sealant film 40. The one pair of electrode terminals 530 are respectively connected to the electrode body 10 on the inside of the accommodation portion 523, respectively intersects with both parts positioned on the outer side in the radial direction of the accommodation portion 523 in the circumferential edge portion 524, and are led out to the outside of the external body 520. The sealant film 40 is fixed in a state of being welded to the first sheet 521 and the second sheet 522.

According to the configuration, similar to the battery 401 of the modification example of the fourth embodiment, the accommodation portion 523 is formed in both of the first sheet 521 and the second sheet 522, and thus, it is possible to prevent the strength of the first sheet 521 and the second sheet 522 from deteriorating. Therefore, it is possible to achieve the battery 501 with high quality.

Sixth Embodiment

Next, a battery 601 of a sixth embodiment will be described.

Figure 28:
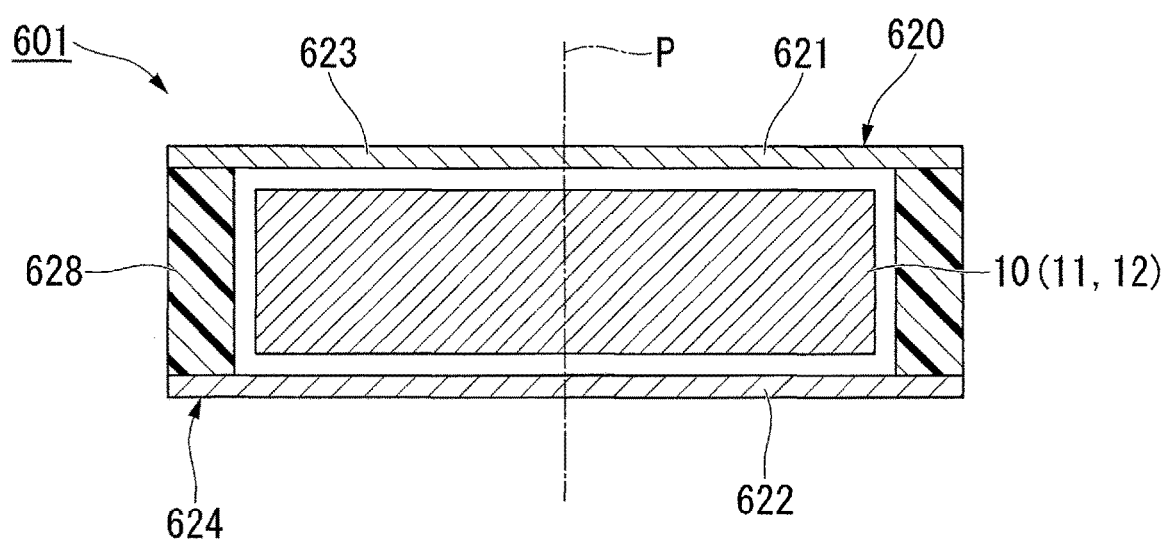
FIG. 28 is a longitudinal sectional view of a battery according to a sixth embodiment.

FIG. 28 is a longitudinal sectional view of the battery of the sixth embodiment.

In each of the above-described embodiments, the first sheet and the second sheet are formed of the laminate film. Meanwhile, the sixth embodiment illustrated in FIG. 28 is different from each of the above-described embodiments in that a first sheet 621 (first member) and a second sheet 622 (second member) are formed of a metal foil. In addition, a configuration similar to that of each of the above-described embodiments will be given the same reference numerals, and a specific description thereof will be omitted.

As illustrated in FIG. 28, the battery 601 is provided with an external body 620 in which the electrode body 10 is accommodated.

The external body 620 is formed by overlapping the first sheet 621 and the second sheet 622 each other. The external body 620 includes a cylindrical accommodation portion 623, and a circumferential edge portion 624 in which the first sheet 621 and the second sheet 622 overlap each other around the accommodation portion 623.

The first sheet 621 is formed of, for example, a stainless foil, in a shape of a disk. The first sheet 621 is connected to the positive electrode body 11 on the inside of the accommodation portion 623. The first sheet 621 functions as the positive electrode terminal.

The second sheet 622 is formed of, for example, an aluminum foil, in a shape of a disk which is the same shape as that of the first sheet 621. The second sheet 622 is connected to the negative electrode body 12 on the inside of the accommodation portion 623. The second sheet 622 functions as the negative electrode terminal.

A sealing member 628 formed of an insulating material is disposed between the first sheet 621 and the second sheet 622 in the circumferential edge portion 624. The sealing member 628 is formed in a circular shape which corresponds to the circumferential edge portion 624. The sealing member 628 is fixed in a state of being welded to the first sheet 621 and the second sheet 622.

In this manner, even when the first sheet 621 and the second sheet 622 are configured to be formed of the metal foil, the inside of the accommodation portion 623 is sealed by the welding between the first sheet 621 and the second sheet 622, and thus, it becomes possible to improve the adhesion of the inside of the accommodation portion 623. Accordingly, it is possible to improve the reliability of the battery 601.

In addition, in the embodiment, the first sheet 621 and the second sheet 622 are formed of the metal foil, but at least any one of the first sheet and the second sheet may be formed of the laminate film.

In addition, the invention is not limited to the above-described embodiments described with reference to the drawings, and various modification examples are considered within the technical range.

For example, in the above-described embodiments, the button-like electrochemical cell is described using a non-aqueous electrolyte secondary battery an example, but the invention is not limited to this case, and it is possible to employ the above-described configuration to an electric double layer capacity or a primary battery.

In addition, in the above-described first to fifth embodiments, the first sheet and the second sheet are welded by nipping the sealant film in the circumferential edge portion, but not being limited thereto, the first sheet and the second sheet may be directly welded to each other. In this case, the electrode terminal is directly nipped by the first sheet and the second sheet in the circumferential edge portion.

In addition, in the above-described embodiments, the accommodation portion is formed in a cylindrical shape, but not being limited thereto, for example, a shape of a square tube formed in a regular hexagonal shape or in a polygonal shape, or a half-cylindrical shape, may be employed.

In addition, in the above-described first to fifth embodiments, the first sheet and the second sheet are formed of the laminate film, but the invention is not limited thereto. Similar to the battery 1 (refer to FIG. 1) according to the first embodiment, the battery 201 (refer to FIG. 14) according to the third embodiment, the battery 301 (refer to FIG. 16) according to the fourth embodiment, and the battery 401 (refer to FIG. 23) according to the modification example of the fourth embodiment, in a case where the first sheet and the second sheet are formed as separate members, at least any one of the first sheet and the second sheet may be formed of the metal material. As the metal material which forms the first sheet or the second sheet, for example, stainless steel, aluminum, aluminum alloy, copper, or nickel, may be used. The first sheet or the second sheet may be formed only of the metal material, or may be formed of a clad material in which the plurality of metal materials are combined with each other. Furthermore, the first sheet or the second sheet may be formed of, for example, a member in which plating is performed with respect to the front surface of the stainless steel.

In this manner, as at least any one of the first sheet and the second sheet is formed of the metal material, compared to a configuration in which the first sheet and the second sheet are formed of the resin material, it is possible to improve the strength of the external body. Accordingly, it is possible to prevent an external force from acting on the electrode body 10 accommodated in the external body, and to prevent the electrode body 10 from being damaged. Therefore, it is possible to improve the reliability of the battery.

Furthermore, by using the stainless steel as the metal material which forms the first sheet or the second sheet, compared to a case where copper or nickel is used as the metal material, it is possible to form at least any one of the first sheet and the second sheet at low costs. Therefore, it is possible to reduce the manufacturing costs of the external body, and to achieve a battery at low costs.

Here, in a case where the first sheet or the second sheet is formed of the metal material, in the first sheet or the second sheet which is formed of the metal material, it is desirable that any one of the positive electrode body 11 and the negative electrode body 12 is electrically connected on the inside of the external body. For example, in a case where the first sheet is formed of the metal material and the second sheet is formed of the laminate film, the positive electrode tab 13 or the negative electrode tab 14 is bonded to the first sheet on the inside of the external body. Accordingly, it is possible to allow the first sheet to function as the positive electrode terminal or the negative electrode terminal. In addition, in a case where each of the first sheet and the second sheet is formed of the metal material, and the first sheet and the second sheet are insulated, one of the positive electrode tab 13 and the negative electrode tab 14 is bonded to the first sheet on the inside of the external body, and the other one of the positive electrode tab 13 and the negative electrode tab 14 is bonded to the second sheet. Accordingly, it is possible to allow the first sheet and the second sheet to respectively function as the positive electrode terminal or the negative electrode terminal. The first sheet or the second sheet which is formed of the metal material, and the positive electrode tab 13 or the negative electrode tab 14 can be bonded, for example, by resistance welding or laser welding, or ultrasonic welding.

In addition, in a case where the first sheet or the second sheet is allowed to function as the positive electrode terminal, it is desirable to form the inner surface which is in contact with the electrolyte by stainless steel, aluminum, or aluminum alloy. In addition, in a case where the first sheet or the second sheet is allowed to function as the negative electrode terminal, it is desirable to form the inner surface which is in contact with the electrolyte by stainless steel, copper, or nickel. Accordingly, it is possible to prevent the first sheet or the second sheet which is formed of the metal material from being in contact with the electrolyte and corroding.

In this manner, as any one of the positive electrode body and the negative electrode body on the inside of the external body is connected to one sheet formed of the metal material of the first sheet and the second sheet, it is possible to allow one sheet to function as the positive electrode terminal or the negative electrode terminal. Accordingly, it is possible to reduce the number of electrode terminals led out to the outside from the inside of the external body. Therefore, it is possible to reduce the manufacturing costs of the battery.

In addition, similar to the battery 201 (refer to FIG. 14) according to the third embodiment, the battery 301 (refer to FIG. 16) according to the fourth embodiment, and the battery 401 (refer to FIG. 23) according to the modification example of the fourth embodiment, in a case where the circumferential edge portion is formed in a cylindrical shape, the electrode terminal disposed between the first sheet and the second sheet in the circumferential edge portion is curved along the shape of the circumferential edge portion. Therefore, compared to a case where the electrode terminal is also formed to be flat along the shape of the circumferential edge portion as the circumferential edge portion is formed to be flat, it becomes difficult to manage temperature when welding the circumferential edge portion. Meanwhile, as described above, by connecting any one of the positive electrode body and the negative electrode body on the inside of the external body to one sheet formed of the metal material among the first sheet and the second sheet, it is possible to reduce the number of electrode terminals, and thus, it is possible to easily manage the temperature when welding the circumferential edge portion.

In addition, without departing from the scope of the invention, it is possible to appropriately replace a configuration element in the above-described embodiments with a known configuration element.

What is claimed is:

1. An electrochemical cell comprising:
   an electrode body including a positive electrode body and a negative electrode body; and
   an external body comprising overlapping first and second members, and accommodating the electrode body,
   wherein the external body further includes a cylindrical accommodation portion in both the first member and the second member, and accommodates the electrode body therein, and a circumferential edge portion in which the first member and the second member overlap each other around the accommodation portion and the circumferential edge portion extends from a periphery of the accommodation portion in a cylindrical plane away from the cylindrical accommodation portion; and
   a sealant film in the circumferential edge portion between the first member and the second member, the sealant film comprising a fusion layer adhering the first and second members,
   wherein an inside of the accommodation portion is sealed in a state where the first member and the second member are welded to each other via the sealant film in the circumferential edge portion.

2. The electrochemical cell according to claim 1, wherein the first member and the second member comprise a laminate film including a metal material and a resin material.

3. The electrochemical cell according to claim 2, further comprising:
   one pair of electrode terminals which are respectively connected to the positive electrode body and the negative electrode body, and are led out to the outside of the external body; and
   the sealant film includes a resin material, and nips the electrode terminal,
   wherein the pair of electrode terminals are nipped by the first member and the second member via the sealant film in the circumferential edge portion, and
   wherein the sealant film is disposed across the entire circumference to surround the accommodation portion, and is fixed in a state where the first member and the second member are welded to each other, in the circumferential edge portion.

4. The electrochemical cell according to claim 1, wherein the circumferential edge portion is disposed to be along an outer circumferential surface of the accommodation portion.

5. The electrochemical cell according to claim 4, wherein a void is provided between the circumferential edge portion and the outer circumferential surface of the accommodation portion.

6. The electrochemical cell according to claim 1, wherein the first member and the second member comprise laminate sheet films having a metal foil, a thermoplastic fusion layer on an inner surface thereof, and a polyester protection layer on an outer surface thereof.

* * * * *